United States Patent
Yasukochi

(10) Patent No.: US 9,862,138 B2
(45) Date of Patent: Jan. 9, 2018

(54) STRUCTURE AND PRODUCTION METHOD THEREFOR

(75) Inventor: Hiroyuki Yasukochi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 457 days.

(21) Appl. No.: 13/534,947

(22) Filed: Jun. 27, 2012

(65) Prior Publication Data
US 2013/0011603 A1    Jan. 10, 2013

(30) Foreign Application Priority Data
Jul. 8, 2011    (JP) .................. 2011-151596

(51) Int. Cl.
*B32B 3/12* (2006.01)
*B29C 64/135* (2017.01)
*B33Y 80/00* (2015.01)
*B33Y 10/00* (2015.01)

(52) U.S. Cl.
CPC ............. *B29C 64/135* (2017.08); *B33Y 10/00* (2014.12); *B33Y 80/00* (2014.12); *Y10T 428/24149* (2015.01); *Y10T 428/249961* (2015.04); *Y10T 428/249981* (2015.04)

(58) Field of Classification Search
CPC . Y10T 428/249953; Y10T 428/249954; Y10T 428/249961; Y10T 428/249971; Y10T 428/349975; Y10T 428/249981; B33Y 80/00; B33Y 10/00; B22F 3/1115; A61L 27/56; A61L 2430/02; A61F 2230/0063; A61F 2250/004; B32B 3/12
See application file for complete search history.

(56) References Cited

U.S. PATENT DOCUMENTS

| | | | |
|---|---|---|---|
| 6,770,322 B1 * | 8/2004 | Moles | 427/230 |
| 6,936,212 B1 | 8/2005 | Crawford | |
| 2004/0145629 A1 | 7/2004 | Silverbrook | |
| 2005/0112397 A1 * | 5/2005 | Rolfe et al. | 428/593 |
| 2006/0141012 A1 * | 6/2006 | Gingras | 424/442 |
| 2007/0203584 A1 * | 8/2007 | Bandyopadhyay et al. | 623/23.5 |
| 2009/0037148 A1 * | 2/2009 | Lin | A61B 17/866 703/1 |

(Continued)

FOREIGN PATENT DOCUMENTS

| | | |
|---|---|---|
| JP | 06-114948 | 4/1994 |
| JP | 2002-347125 | 12/2002 |
| WO | WO2011022550 A1 * | 2/2011 |

OTHER PUBLICATIONS

Mannino, B.; "8 Rubik's Cube Artworks", Woman's Day, 2009, p. 1-7; Accessed at http://www.womansday.com/life/a1006/8-rubiks-cube-artworks-98006/.*

(Continued)

*Primary Examiner* — Mark Ruthkosky
*Assistant Examiner* — Julia L Rummel
(74) *Attorney, Agent, or Firm* — Chip Law Group

(57) ABSTRACT

A structure including a substrate and a coating material. The substrate includes a plurality of voids and a surface on which at least the plurality of voids are formed, and is formed such that a void ratio of the plurality of voids decreases one of 2-dimensionally and 3-dimensionally from an inner side of the substrate toward an outer side thereof. The coating material is formed on the surface of the substrate.

8 Claims, 23 Drawing Sheets

(56) References Cited

U.S. PATENT DOCUMENTS

2011/0101569 A1    5/2011  Yasukochi
2011/0129640 A1*   6/2011  Beall et al. .................. 428/116

OTHER PUBLICATIONS

CubiChronicals, 2003, p. 9-15, Accessed at http://www.math.nus.edu.sg/aslaksen/gem-projects/maa/0203-2-10-Rubik.pdf.*
"Void Cube", Wikipedia, 2009, p. 1; Accessed on Aug. 20, 2015 at http://web.archive.org/web/20091109171926/http://en.wikipedia.org/wiki/Void_Cube.*
Yao, C.; Storey, D.; Webster, T.; "Nanostructured Metal Coatings on Polymers Increase Osteoblast Attachment", International Journal of Nanomedicine, 2007, vol. 2, p. 487-492.*
Lee, K.; Wang, S.; Fox, B.; Ritman, E.; Yaszemski, M.; Lu, L.; "Poly(propylene fumarate) Bone Tissue Engineering Scaffold Fabrication Using Stereolithography: Effects of Resin Formulations and Laser Parameters", Biomacromolecules, 2007, vol. 8, p. 1077-1084.*
Extended European Search Report issued in connection with European Patent Application No. 12004808.7, dated Nov. 5, 2012. (6 pages).

* cited by examiner

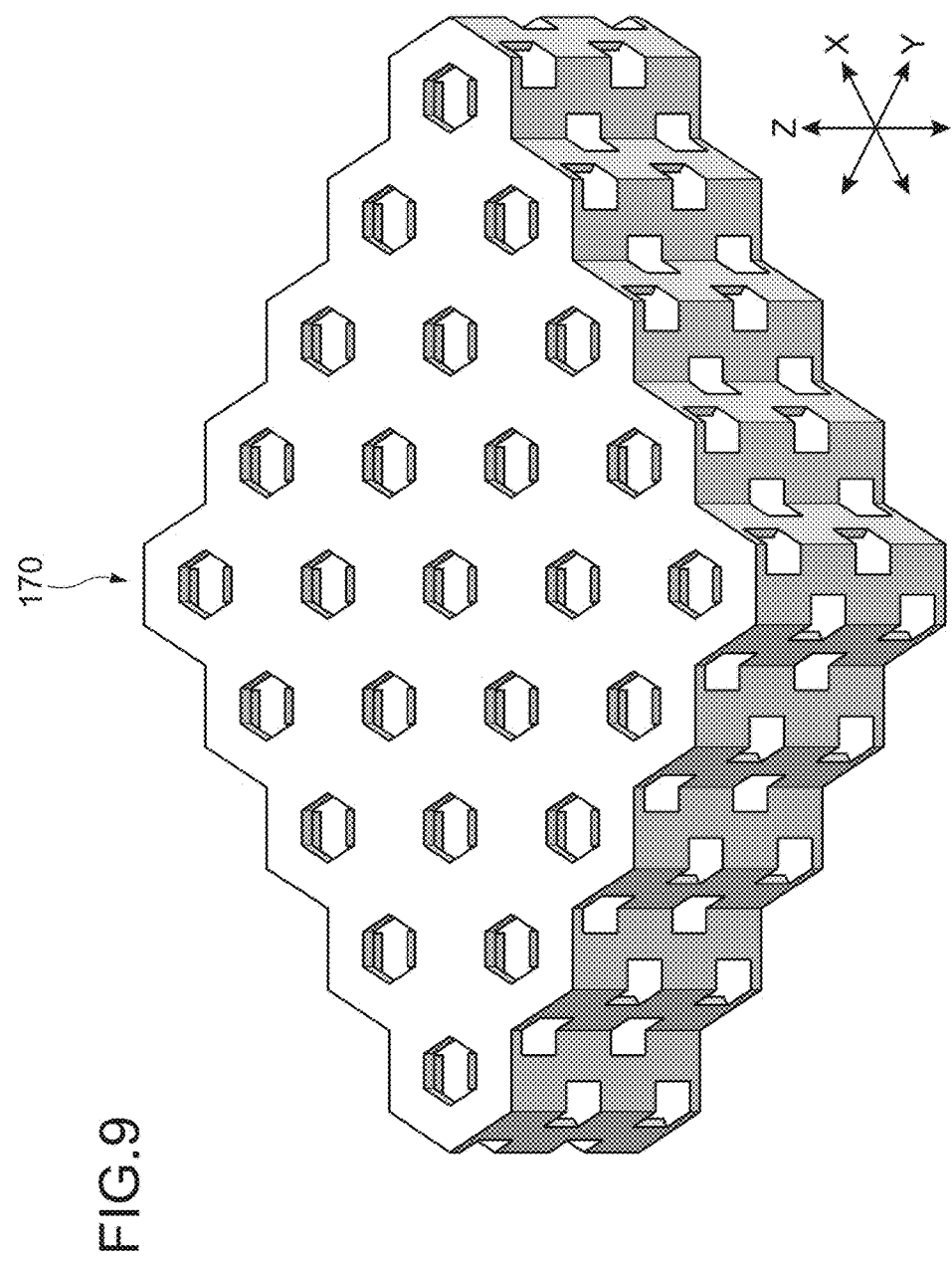

STRUCTURE AND PRODUCTION METHOD THEREFOR

CROSS REFERENCES TO RELATED APPLICATIONS

The present application claims priority to Japanese Priority Patent Application JP 2011-151596 filed in the Japan Patent Office on Jul. 8, 2011, the entire content of which is hereby incorporated by reference.

BACKGROUND

The present disclosure relates to a structure and a production method therefor.

An optically molded article disclosed in Japanese Patent Application Laid-open No. 2002-347125 (hereinafter, referred to as Patent Document 1) is used as a 3D model for a design product. A portion of the 3D model corresponding to a thickness part of the design product is formed to be hollow, and the hollow inside has a honeycomb structure. As a result, variances in the intensity at parts of the 3D model are lessened (see, for example, paragraph [0020] of Patent Document 1).

A molded form disclosed in Japanese Patent Application Laid-open No. Hei 06-114948 (hereinafter, referred to as Patent Document 2) also has a honeycomb structure inside. In such a molded form, communication holes are formed so that cells sectioned by ribs forming the honeycomb structure communicate. As a result, it becomes easy to discharge uncured liquid remaining in the cells in the honeycomb structure (see, for example, paragraph [0013] of Patent Document 2).

SUMMARY

As the structure, a structure having a new shape is demanded.

In view of the circumstance as described above, there is a need to provide a useful structure having a new shape and a production method therefor.

According to an embodiment of the present disclosure, there is provided a structure including a substrate and a coating material.

The substrate includes a plurality of voids and a surface on which at least the plurality of voids are formed, and is formed such that a void ratio of the plurality of voids decreases one of 2-dimensionally and 3-dimensionally from an inner side of the substrate toward an outer side thereof.

The coating material is formed on the surface of the substrate.

In the embodiment of the present disclosure, the void ratio on the inner side of the substrate is smaller than that on the outer side, and the coating material is formed on the surface of the voids formed on the substrate. In other words, the embodiment of the present disclosure can realize a new structure.

Further, a structure having a useful function can be realized by such an arrangement of the voids and an appropriate selection of the coating material.

The substrate may further include a communication hole that makes the plurality of voids communicate. With this structure, since the material of the coating material is applied onto the surface of the plurality of voids via the communication hole, the coating material can be formed with ease.

The substrate may include a plurality of communication holes. In this case, a shortest distance encompassing the surface of the substrate via the plurality of voids and the plurality of communication holes is 100 to 10000 times the coating material in a thickness direction. With such a thickness of the coating material, a sufficient intensity can be secured for the structure.

The coating material may include a metal layer. Alternatively, the coating material may further include a resin layer formed on the metal layer.

The plurality of voids may be aligned regularly on the substrate. With this structure, the intensity of the structure can be additionally enhanced.

An alignment of opening surfaces of the plurality of voids may be a honeycomb structure.

According to an embodiment of the present disclosure, there is provided a production method for a structure including supplying a material of a substrate that cures by an energy of an energy beam to a supply area.

By irradiating the energy beam onto an area selected from an entire area of the material supplied to the supply area, the substrate that includes a plurality of voids and a surface on which at least the plurality of voids are formed is formed such that a void ratio of the plurality of voids decreases one of 2-dimensionally and 3-dimensionally from an inner side of the substrate toward an outer side thereof.

A coating material is formed on the surface of the formed substrate.

The production method for a structure uses a structure forming apparatus including a stage and a regulation body.

The regulation body includes a surface having a linear area formed along a first direction and is provided opposed to the stage such that the linear area comes closest to the stage out of the surface.

The supplying of the material includes supplying the material to a slit area as an area between an area on a side on which the stage is arranged and the linear area.

The forming of the substrate includes curing at least one layer of the material by relatively moving the regulation body and the stage along a second direction different from the first direction.

As described above, since the material is irradiated with the energy beam while being restricted to the linear area (i.e., 1D area), the structure can be formed with high accuracy.

The forming of the substrate may include forming a part of the substrate such that the void ratio of the part of the substrate increases from a first side closer to the stage toward a second side farther from the stage. In this case, a plurality of parts of the substrate are formed. In addition, the plurality of parts of the substrate are attached such that the plurality of parts of the substrate are connected on the second sides thereof. With this structure, the substrate can be formed easily with high accuracy.

The forming of the substrate may include forming a sheet-like substrate such that the void ratio decreases 2-dimensionally from an inner side of the sheet-like substrate toward an outer side thereof and the plurality of voids are aligned regularly. In this case, the sheet-like substrate is prepared plurally. In addition, the production method for a structure further includes attaching the sheet-like substrates such that the sheet-like substrates are deviated in a rotational direction about an axis vertical to an attachment surface of the sheet-like substrates. With this structure, positioning accuracy for attaching the plurality of sheet-like substrates is allowed to be low, and a structure having an enough intensity to endure a stress from any direction at any position can be realized.

As described above, according to the embodiments of the present disclosure, a useful structure having a new shape and a production method therefor can be realized.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 9 is a perspective view showing a structure in which the unit cell shown in FIG. 8 is arranged regularly in a 3D;

DETAILED DESCRIPTION

Hereinafter, embodiments of the present disclosure will be described with reference to the drawings.

[First Embodiment of Structure]

Figure 1:
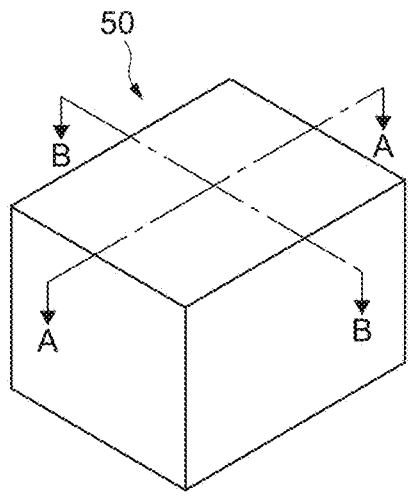
FIG. 1 is a perspective view showing a structure according to a first embodiment of the present disclosure.
Figure 2:
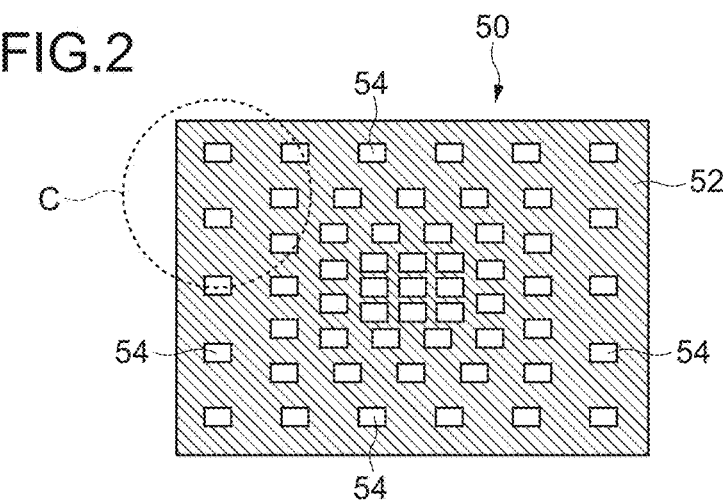
FIG. 2 is a cross-sectional diagram taken along a surface including the line A-A of FIG. 1.
Figure 3:
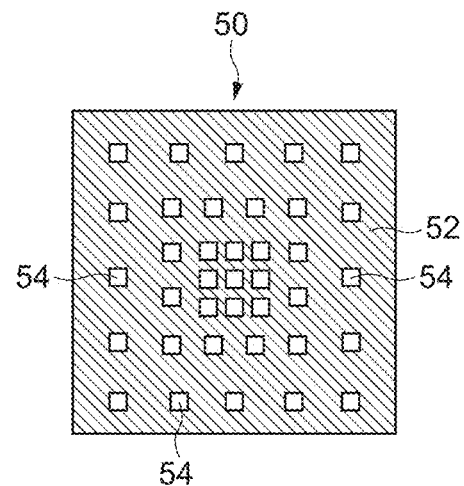
FIG. 3 is a cross-sectional diagram taken along a surface including the line B-B of FIG. 1.

FIG. 1 is a perspective view showing a structure according to a first embodiment of the present disclosure. FIG. 2 is a cross-sectional diagram of a structure 50 taken along a surface including the line A-A of FIG. 1. FIG. 3 is a cross-sectional diagram of the structure 50 taken along a surface including the line B-B of FIG. 1.

The structure 50 includes a substrate 52 and a coating material 56 (see FIG. 4) formed on a surface 52a of the substrate 52.

As shown in FIGS. 2 and 3, the substrate 52 is, for example, cuboid and has a plurality of voids 54 inside. The substrate 52 is formed such that a void ratio of the voids 54 decreases 3-dimensionally from an inner side of the substrate 52 toward an outer side thereof. Further, the voids 54 are aligned regularly. The void ratio is generally a ratio of a space in a material of the substrate 52 per unit volume.

The phrase "the voids 54 are aligned regularly" means that an increase rate (decrease rate) of a pitch of the voids is constant or has a predetermined regularity, a relative arrangement angle of the voids is constant or has a predetermined regularity, or an arrangement symmetry of the voids is maintained in at least a partial area.

Figure 4:
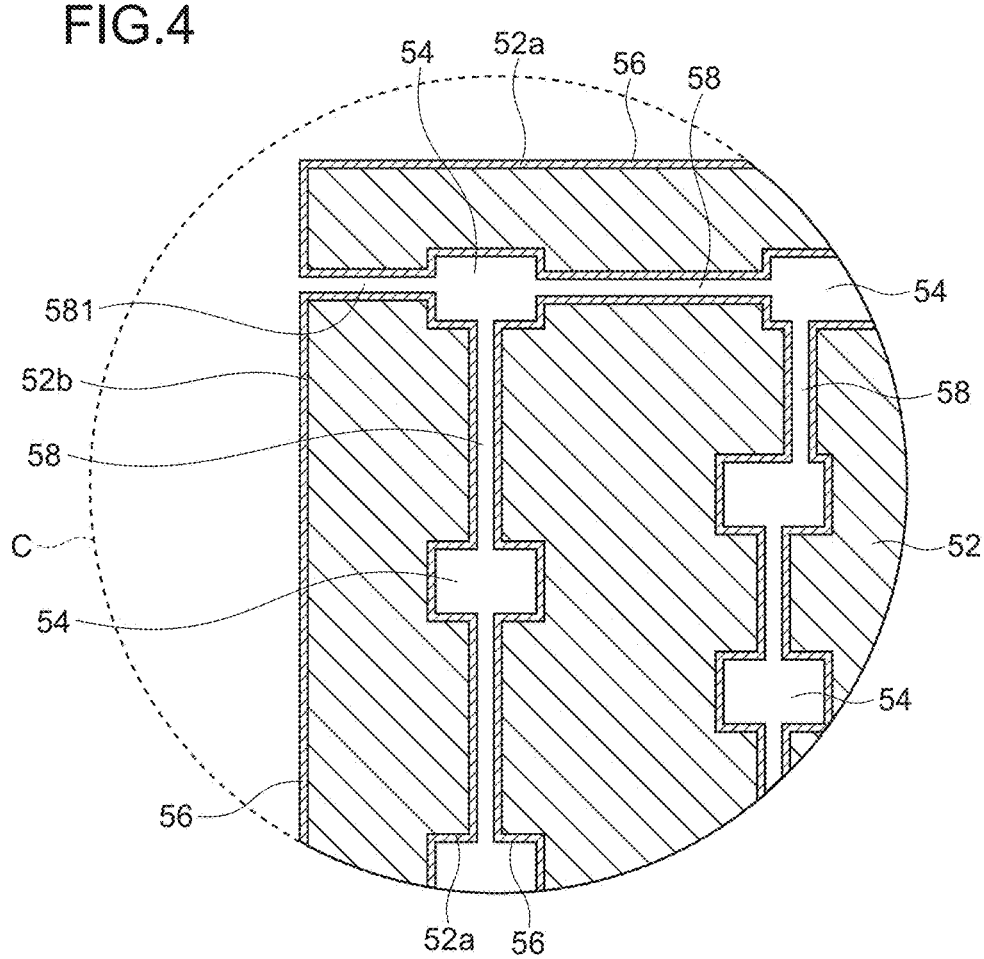
FIG. 4 is an enlarged diagram of a portion surrounded by a broken line in FIG. 2.

FIG. 4 is an enlarged diagram of a portion C surrounded by a broken line in FIG. 2. A communication path (hole) 58 that makes two arbitrary voids 54 communicate is provided between those voids 54. The communication path 58 is provided not only parallel to one cross section shown in FIG. 4 but also along arbitrary directions. In at least one of the outermost voids 54 in the substrate 52, a communication path 581 that makes that void 54 communicate with the outside (peripheral space of structure 50) is provided. The communication paths 58 and 581 are appropriately arranged such that the innermost void 54 of the substrate 52 communicates with the outside. It should be noted that the communication paths 58 and 581 are not illustrated in FIGS. 2 and 3.

As shown in FIG. 4, the coating material 56 is formed on the surface of the substrate 52, that is, an outer surface 52b of the substrate 52 and the surface 52a on which the voids 54 are formed. In other words, the coating material 56 is also formed inside the voids 54.

The coating material 56 may be formed by, for example, either a wet method or a dry method. In a case of the wet method, the coating material 56 is formed by causing a liquid to enter the voids 54 via the communication paths 58 and 581.

Also in the case of the wet method, the coating material 56 is formed as a plated layer by, for example, electrolytic plating or non-electrolytic plating. Alternatively, the coating material 56 may be formed by a so-called dip method that simply immerses the structure 50 in a plating tank.

Alternatively, as hot-dip plating, non-electrolytic plating (e.g., non-electrolytic nickel plating) may be first performed on a substrate to enhance a heat resistance and wet property of a structure, and then perform hot-dip plating so that a thick coating material can be obtained in a short time.

In a case of the dry method, the coating material 56 is formed by, for example, CVD (Chemical Vapor Deposition).

The coating material 56 may be formed of metal or a resin, or may be a mixture of those. Examples of the metal include aluminum, nickel, chromium, and titanium. As the resin, an ABS, an acrylic resin, a polyethylene-based resin, or the like is used. Alternatively, the coating material 56 may be formed of DLC (Diamond Like Carbon).

As described above, the void ratio on the inner side of the substrate 52 is smaller than that on the outer side, and the coating material 56 is formed on the surface 52a of the voids 54 formed on the substrate 52. As a result, a structure 50 having a new shape can be realized, and a structure 50 having a useful function can be realized depending on a type of the material for the coating material.

The arrangement for the void ratio as described above bears the following effect. For example, in a case where various forces such as a bending force, a shearing force, and a tensile force are applied to the structure 50, a larger stress is applied to the outer side of the structure 50 than the inner side in most cases. Therefore, the volume of the material of the substrate on the outer side of the structure 50 is made denser than that on the inner side so that the volume becomes less dense toward the inner side. As a result, it becomes possible to make the (average) density of the entire structure 50 as small as possible and enhance the intensity and rigidity thereof. In other words, a specific intensity (specific rigidity (rigidity per unit mass) of the structure 50 can be enhanced.

In this embodiment, by providing the coating material 56, a structure 50 having a higher intensity than that with no coating material 56 can be realized.

Depending on the material of the coating material 56, the structure 50 can be variously used for purposes other than enhancing the intensity. For example, various properties such as hydrophobicity (e.g., fluorine-based material), hydrophilicity (e.g., silica-based material and titanium-oxide-based material), an antifouling property (e.g., titanium-based material and carbon-based material), and heat resistance (e.g., nickel-based material, chromium-based material, and titanium-based material) can be imparted to the structure 50.

For example, when a coating material 56 having a high intensity and heat resistance, such as a titanium-based material, is used, the structure 50 can be used as a turbine blade that is exposed to a fast rotation, a high pressure, and a high temperature.

In this embodiment, by providing the communication holes, the material of the coating material 56 passes the communication holes so as to be applied onto the surface 52a of the plurality of voids 54. As a result, the coating material 56 can be formed with ease.

It should be noted that although the shape of the voids 54 is a square in FIGS. 2 and 3, the shape may be a sphere, an ellipsoid, a cylinder, a truss shape, an irregular shape, or a combination of those.

Although the voids 54 are aligned regularly in the descriptions above, the arrangement may be irregular or random as long as the voids 54 are arranged so as to decrease in number from the inner side toward the outer side.

[Second Embodiment of Structure]

Figure 5:
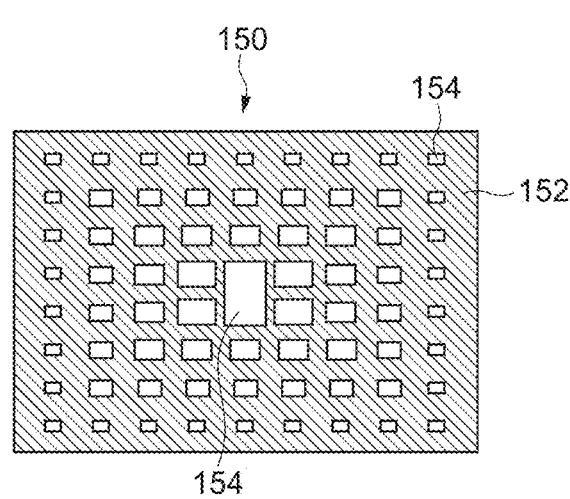
FIG. 5 is a cross-sectional diagram showing a structure according to a second embodiment of the present disclosure.

FIG. 5 is a cross-sectional diagram showing a structure 150 according to a second embodiment of the present disclosure. In descriptions below, descriptions on portions, functions, and the like that are the same as those of the structure 50 according to the first embodiment shown in FIG. 1 and the like will be simplified or omitted, and different points will mainly be described.

The structure 150 includes a substrate 152 including a plurality of voids 154 and a coating material (not shown) formed on a surface of the substrate 152. The coating material is also formed inside the voids 154 as in the structure 50 according to the first embodiment.

The structure 150 is cuboid as in the first embodiment. In one cross section of the structure 150 shown in FIG. 5, pitches of the voids 154 are substantially the same. However, volumes of the voids 154 decrease from an inner side toward an outer side. In other words, the substrate 152 is formed such that a void ratio of the voids 154 decreases 3-dimensionally from the inner side of the substrate 152 toward the outer side thereof.

Such a structure 150 bears the same effect as the structure 50 according to the first embodiment.

In the first and second embodiments, the substrates 52 and 152 are formed such that the void ratios decrease 3-dimensionally from the inner sides of the substrates 52 and 152 toward the outer sides thereof. However, the substrates 52 and 152 may be formed such that the void ratios decrease 2-dimensionally from the inner sides of the substrates 52 and 152 toward the outer sides thereof.

[Third Embodiment of Structure]

Figure 6:
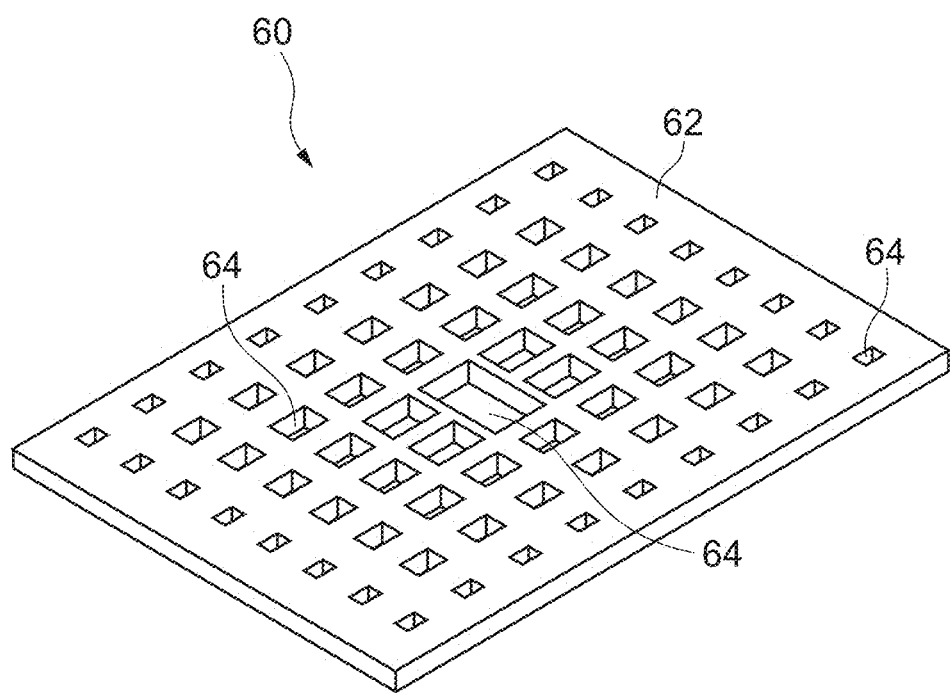
FIG. 6 is a perspective view showing a structure according to a third embodiment of the present disclosure and a main portion thereof.

FIG. 6 is a perspective view showing a structure 60 according to a third embodiment of the present disclosure and a main portion thereof.

The structure 60 includes a substrate 62 including a plurality of voids 64 and a coating material (not shown). The structure 60 has a thin cuboid shape (e.g., plate-like shape) or a thin sheet-like shape, and the voids 64 penetrate the plate as the substrate 62. An arrangement pattern of the voids 64 is the same as that shown in FIG. 5.

As described above, even in the plate- or sheet-like structure 60, by forming the substrate 62 such that the void ratio decreases 2-dimensionally from an inner side of the substrate 62 toward an outer side thereof, a specific intensity and specific rigidity of the structure 60 can be enhanced.

Further, the plate- or sheet-like structure 60 can be used as a filter or a catalyst.

Although the shape of the structures 50, 150, and 60 is a cuboid shape in the first to third embodiments, the shape is not limited and may be an arbitrary shape.

[Fourth Embodiment of Structure]

Although not shown, as a structure according to a fourth embodiment of the present disclosure, a coating material also includes a resin layer formed on a metal layer. In other words, the structure includes the substrate as in the embodiments above, a metal layer formed on the surface of the substrate, and a resin layer formed on the metal layer.

In a production method for the structure, after the metal layer is formed on a surface of the substrate, a resin fluid is impregnated into the substrate on which the metal layer is formed. For example, a fiber-reinforced plastic is well known, but by impregnating the resin into the structure in which the metal layer is formed, the structure becomes a metal-fiber-reinforced plastic.

[Fifth Embodiment of Structure]

Figure 7:
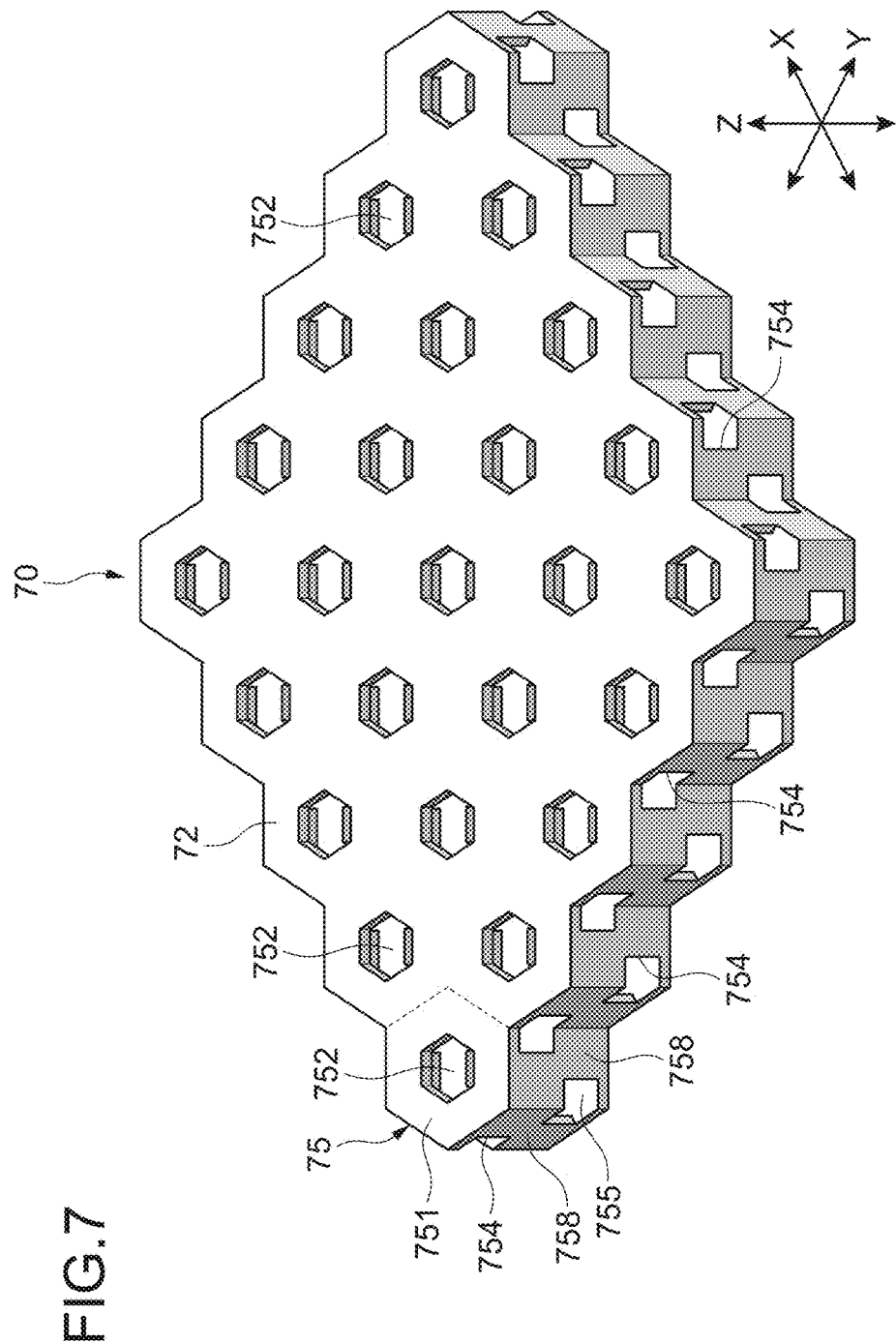
FIG. 7 is a perspective view showing a main portion of a structure according to a fifth embodiment of the present disclosure.
Figure 8:
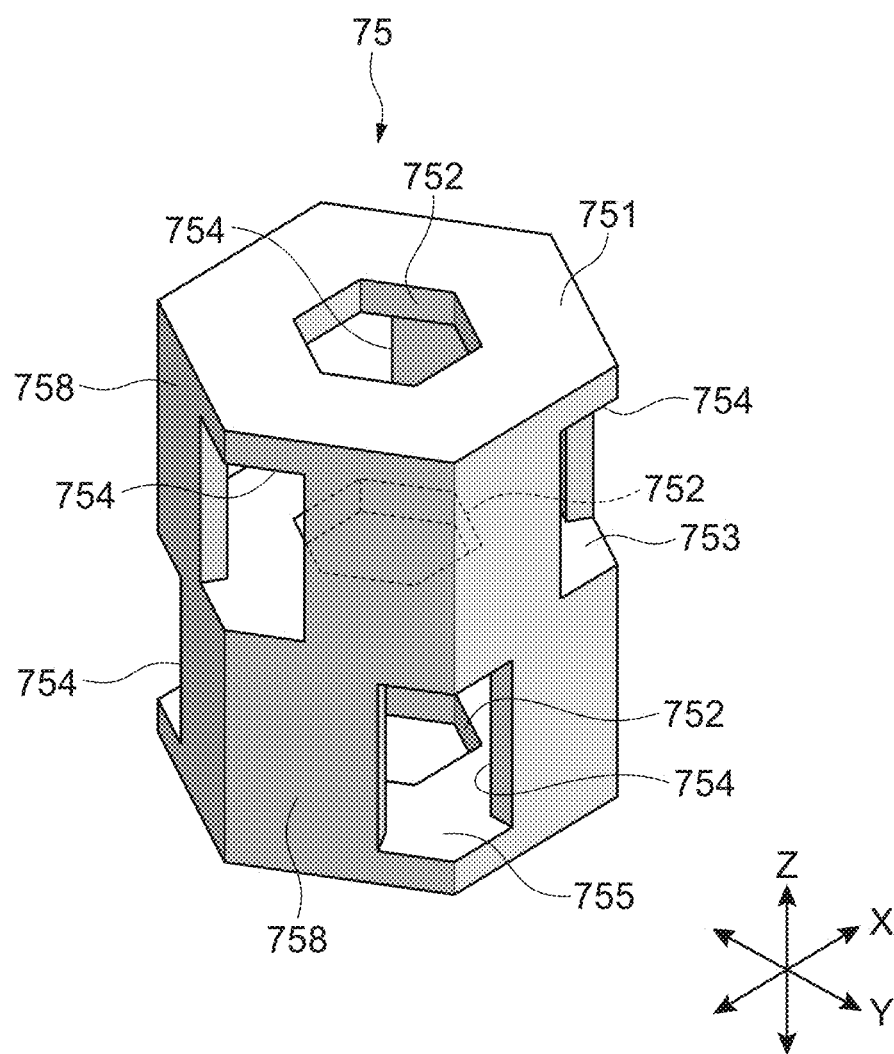
FIG. 8 is a perspective view showing a unit cell forming the structure shown in FIG. 7.

FIG. 7 is a perspective view showing a main portion of a structure 70 according to a fifth embodiment of the present disclosure. FIG. 8 is a perspective view showing a unit cell 75 forming the structure 70 shown in FIG. 7.

The unit cell 75 includes, as in the embodiments above, a substrate 72 (see FIG. 10B) and a coating material 76 (see FIG. 10B) formed on a surface of the substrate 72.

As shown in FIG. 8, the unit cell 75 includes a hexagonal upper wall 751, a middle wall 753, and a lower wall 755, and also 6 side surfaces 758 corresponding to sides of the walls 751, 753, and 755. The upper wall 751, the middle wall 753, and the lower wall 755 each has one opening (hereinafter, referred to as plane hole for convenience) 752. The plane hole 752 is hexagonal. Moreover, two openings 754 are formed on one side surface 758, and each opening 754 is formed to be integrally continuous with the opening 754 of the adjacent side surface 758. Such an integral opening that is formed across two side surfaces 758 will be referred to as side opening 754 for convenience. The side opening 754 is rectangular (or square).

The two side openings 754 formed on one side surface 758 are deviated in an oblique direction instead of being formed on a straight line parallel to the upper wall 751 and the lower wall 755 (parallel to X-Y plane). In other words, the three side openings 754 on the upper side are arranged at a 120-degree interval in a circumferential direction (about Z axis) of the hexagon, and the three side openings 754 on the lower side are also arranged at a 120-degree interval in the circumferential direction. The group of the three side openings 754 on the upper side and the group of the three side openings 754 on the lower side are deviated 60 degrees in the circumferential direction.

An inner area surrounded by the upper wall 751, the middle wall 753, and the 6 side surfaces 758 practically becomes one void area. Moreover, an inner area surrounded by the lower wall 755, the middle wall 753, and the 6 side surfaces 758 practically becomes one void area. In other words, the unit cell includes two voids arranged in the Z-axis direction.

The structure 70 shown in FIG. 7 is structured by collecting a plurality of thus-structured unit cells 75 and regularly aligning the unit cells 75 in a 2D. Alternatively, a structure 170 in which the unit cells 75 are regularly aligned in a 3D as shown in FIG. 9 can also be realized.

In the structures 70 and 170, the voids adjacent in the lateral and longitudinal directions communicate via the plane holes 752 and the side openings 754. Therefore, the plane hole 752 and the side opening 754 each function as a communication hole. The unit cell 75 having such a structure will hereinafter be referred to as open cell.

Here, by preparing a plurality of stepwise values for at least one of an opening area of the plane hole 752, an opening area of the side opening 754, and a volume of the voids, a plurality of types of unit cells 75 each as an open cell are prepared. By appropriately adjusting the arrangement of the plurality of types of unit cells 75, the structures 70 and 170 in each of which the void ratio decreases 2- or 3-dimensionally from the inner side of the substrate 72 toward the outer side thereof can be realized. For example, the structures 70 and 170 only need to be formed such that a group of unit cells 75 having a relatively-small void volume is arranged relatively on the outer side of the substrate 72 and a group of unit cells 75 having a relatively-large void volume is arranged relatively on the inner side of the substrate 72.

Alternatively, unit cells having substantially the same shape as the unit cell shown in FIG. 8 but of different sizes may be combined to form a substrate. In other words, by combining the unit cells having a plurality of stepwise sizes, a substrate in which a void ratio decreases 2- or 3-dimensionally from an inner side of the substrate toward an outer side thereof can be formed.

The structures 70 and 170 of this embodiment also bear the same effect as the structures according to the embodiments above.

Since an alignment of the opening surfaces of the voids is a honeycomb structure in the structures 70 and 170, the intensity can be enhanced.

Since the coating material 76 reaches every corner in this embodiment, both the high intensity and high heat resistance can be realized depending on the material of the coating material 76.

Figure 10A:
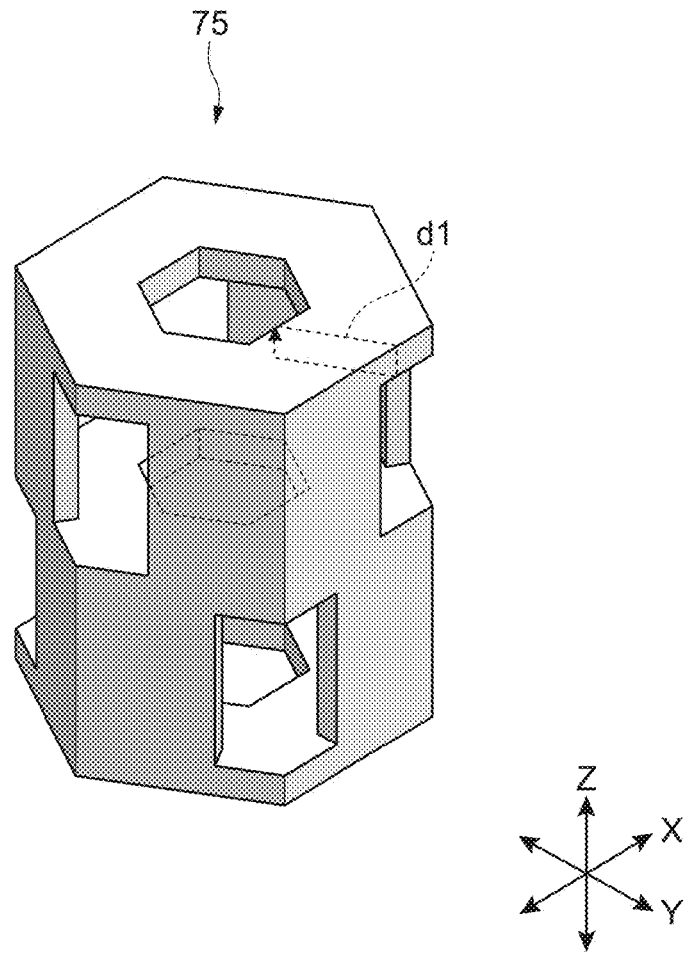
FIGS. 10A and 10B are diagrams for explaining a thickness of a coating material.
Figure 10B:
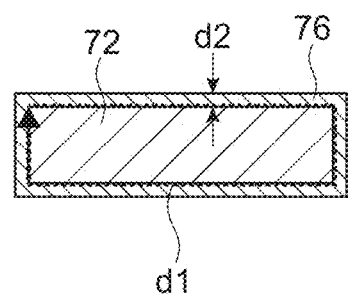

As shown in FIGS. 10A and 10B, a shortest distance d1 (length of arrow indicated by broken line in FIG. 10A) encompassing the surface 52a of the substrate 72 via the plurality of voids, the plane hole 752, and the side opening 754 in the structures 70 and 170 is 100 to 10000 times the thickness d2 of the coating material. The plurality of voids in the unit cell 75 shown in FIG. 10A refer to at least 3 voids including the upper void of the unit cell 75 as a reference void and the voids adjacent to the reference void in the Y-axis (or X-axis) direction and the Z-axis direction. For example, when the thickness d2 is 1 μm, the shortest distance d1 becomes 10 mm when assumed to be 10000 times the thickness d2.

When the shortest distance d1 is smaller than 100 times the thickness d2, the substrate 72 itself becomes too thin or too slim, with the result that the intensity of the substrate 72 is lowered that much. When the shortest distance d1 is larger than 10000 times the thickness d2, a contact area of a practical plane between the substrate 72 and the coating material 76 becomes too large, and thus there is a fear that the coating material 76 is apt to be peeled off. When the practical plane on which the coating material 76 is formed is large, dust and air bubbles highly likely enter the space between the substrate 72 and the coating material 76, and thus there is a fear that the coating material 76 is apt to be peeled off.

[Sixth Embodiment of Structure]

Figure 11:
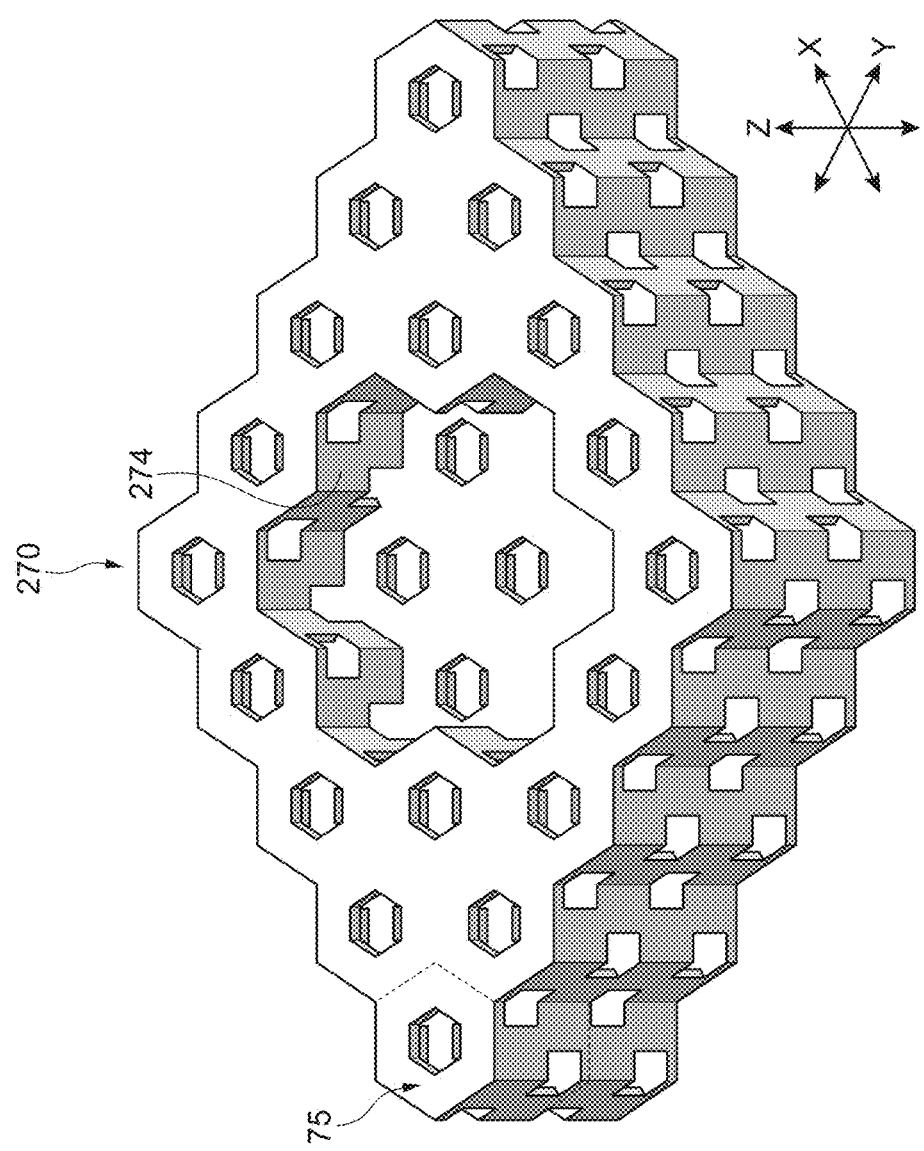
FIG. 11 is a perspective view showing a main portion of a structure according to a sixth embodiment of the present disclosure.

FIG. 11 is a perspective view showing a main portion of a structure 270 according to a sixth embodiment of the present disclosure.

A unit cell of the structure 270 is substantially the same as the unit cell 75 as the open cell shown in FIG. 8. In the middle of the structure 270, a void 274 larger than the void of the unit cell 75 is provided. Such a void 274 is formed by removing 7 unit cells 75 in the middle from the structure 270 shown in FIG. 9. Accordingly, the structure 270 in which a void ratio of all the voids (voids in unit cells 75 and void 274) decreases 3-dimensionally from an inner side of the structure 270 toward an outer side thereof can be realized.

Further, the shape of the void 274 formed by removing 7 unit cells 75 from the structure 270 is practically a hexagonal cylinder, that is, the structure 270 has a self-similar shape (fractal shape).

Figure 12:
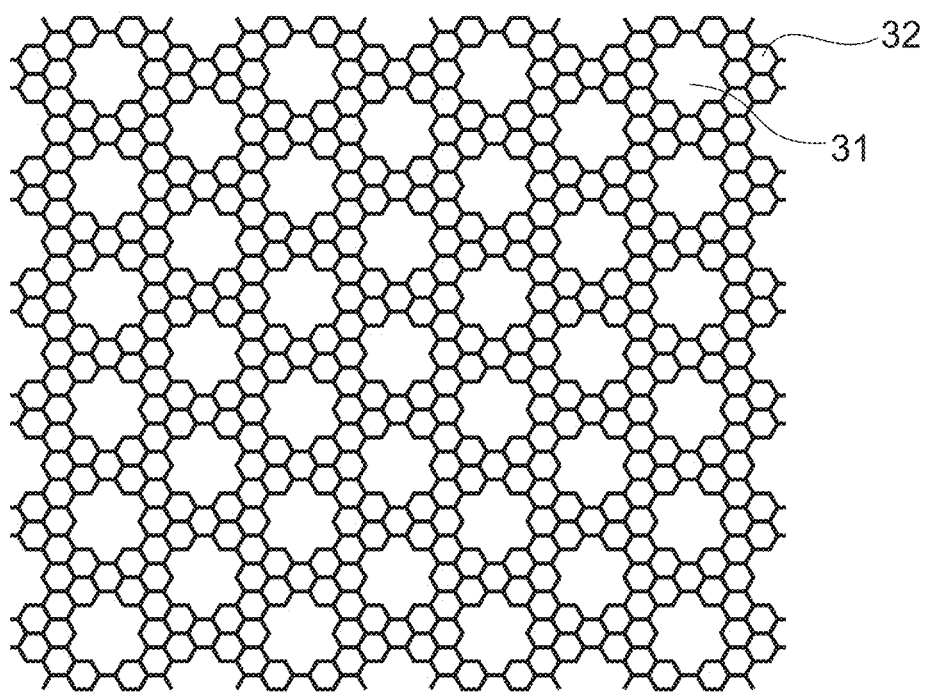
FIG. 12 is a diagram for explaining the structure shown in FIG. 11 by a 2D model.

Here, the structure 270 will be described using a 2D model as shown in FIG. 12. As shown in FIG. 12, minimum hexagonal voids 32 are aligned regularly as in a honeycomb structure. Moreover, practically-hexagonal voids 31 larger than the minimum hexagonal voids 32 are formed. Each of the voids 31 is formed by an aggregation of the plurality of voids 32. Looking at the structure 270 shown in FIG. 11 2-dimensionally, the shape of the structure 270 is a shape of a portion formed by one void 31 and the plurality of peripheral voids 32 constituting the void 31 out of the sheet-like structure shown in FIG. 12.

According to this embodiment, a structure 270 having a high specific intensity and specific rigidity can be realized by the honeycomb structure having a self-similar shape.

[Seventh Embodiment of Structure]

Figure 13:
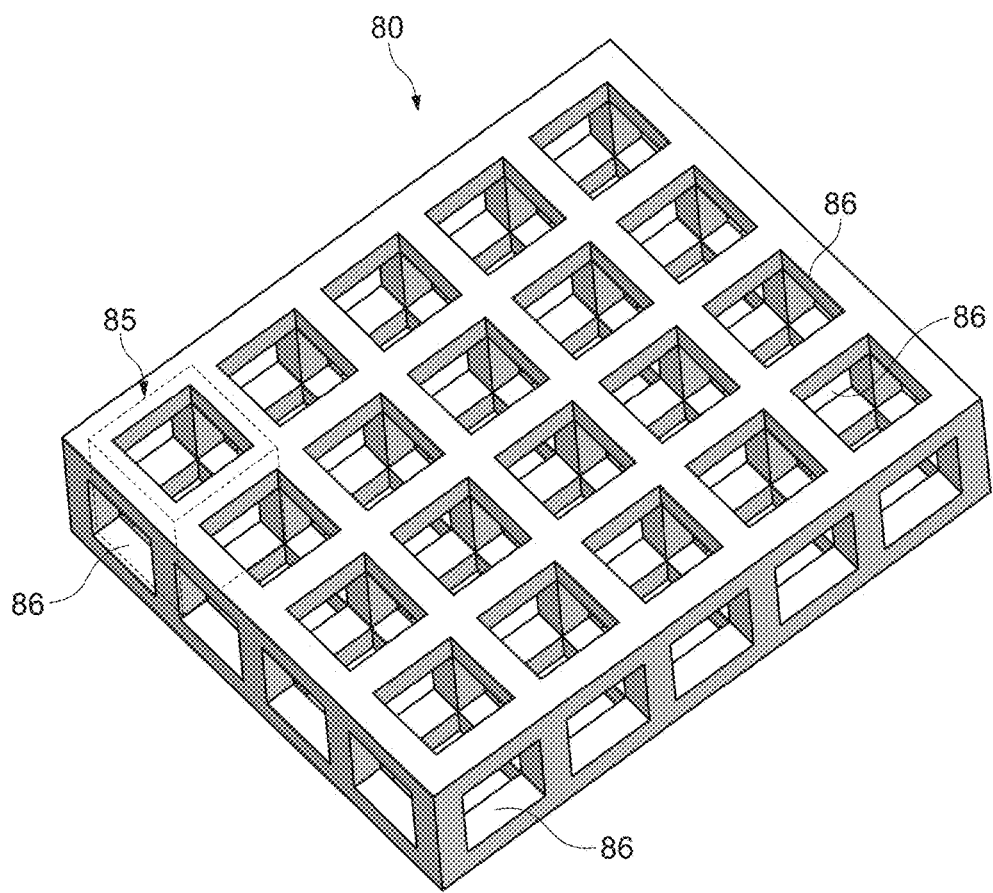
FIG. 13 is a perspective view showing a main portion of a structure according to a seventh embodiment of the present disclosure.

FIG. 13 is a perspective view showing a main portion of a structure 80 according to a seventh embodiment of the present disclosure.

The structure 80 is formed by unit cells 85 each having a simpler shape (cube) than the unit cell 75 described above. The unit cells 85 each have a cubical frame shape and are each an open cell that includes openings (communication holes) 86 in 8 longitudinal and lateral directions. By using the unit cells 85 as described above, a structure having a self-similar shape as described above can be realized. In other words, by removing one or a plurality of unit cells 85 at a middle portion of the structure 80 shown in FIG. 13, a structure in which a void ratio of voids in a substrate decreases 2- or 3-dimensionally from an inner side of the substrate toward an outer side thereof can be realized.

Figure 14:
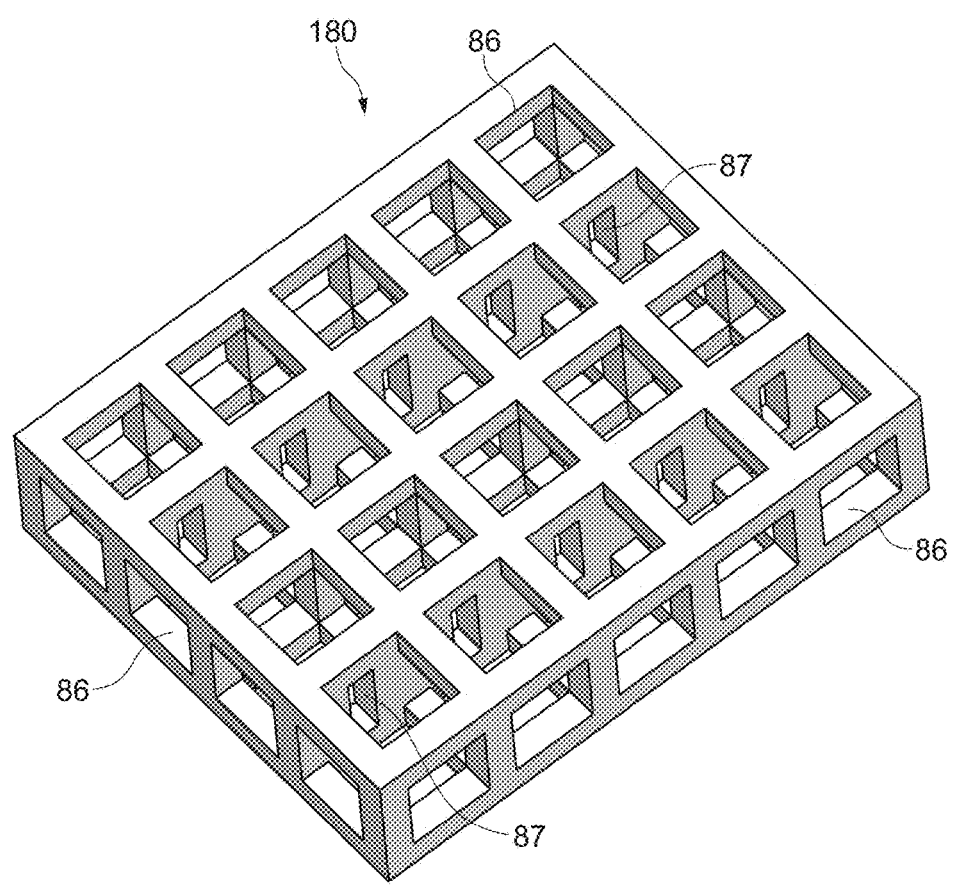
FIG. 14 is a perspective view showing a main portion of a structure constituted of unit cells each including a small opening.
Figure 15:
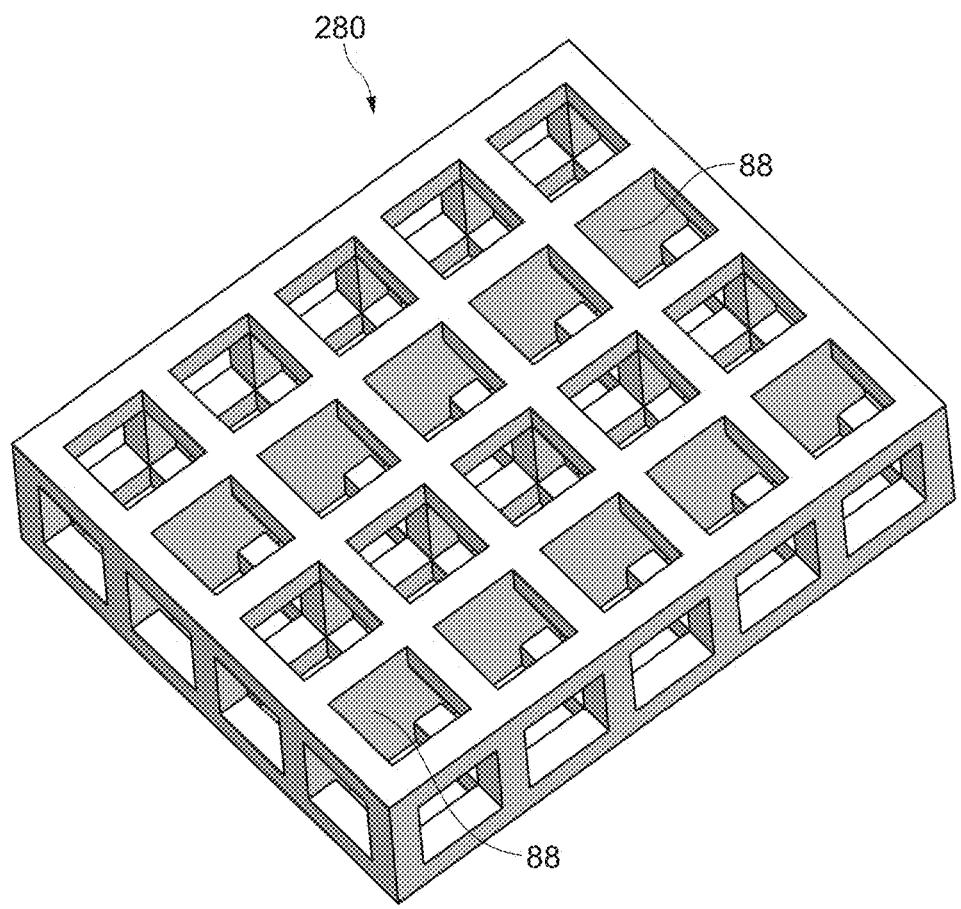
FIG. 15 is a perspective view showing a main portion of a structure in which the small openings are blocked by the coating material.

As shown in FIG. 14, the substrate may be formed such that a size of one opening 87 out of openings 86 and 87 formed in each of the cubical unit cells 85 in 8 directions becomes smaller than that of other openings 86. By forming a coating material (not shown) on a surface of the substrate, the small openings 87 are blocked as shown in FIG. 15 depending on the thickness of the coating material, to thus form walls 88. Such a structure 280 can be realized by appropriately setting the thickness of the coating material, the size of the substrate (size of openings 87), and the like.

The unit cells constituting the structure 280 formed such that the openings between partial voids adjacent to each other are blocked will hereinafter be referred to as semi-closed cells.

For example, the structure 280 constituted of the semi-closed cells or a structure formed by combining the open cells described above and the semi-closed cells can be used as a flow path device having minute flow paths. When the structure 280 is used as the flow path device, a cover is provided at an outer surface position (at least bottom portion etc.) of the structure 280.

Figure 16:
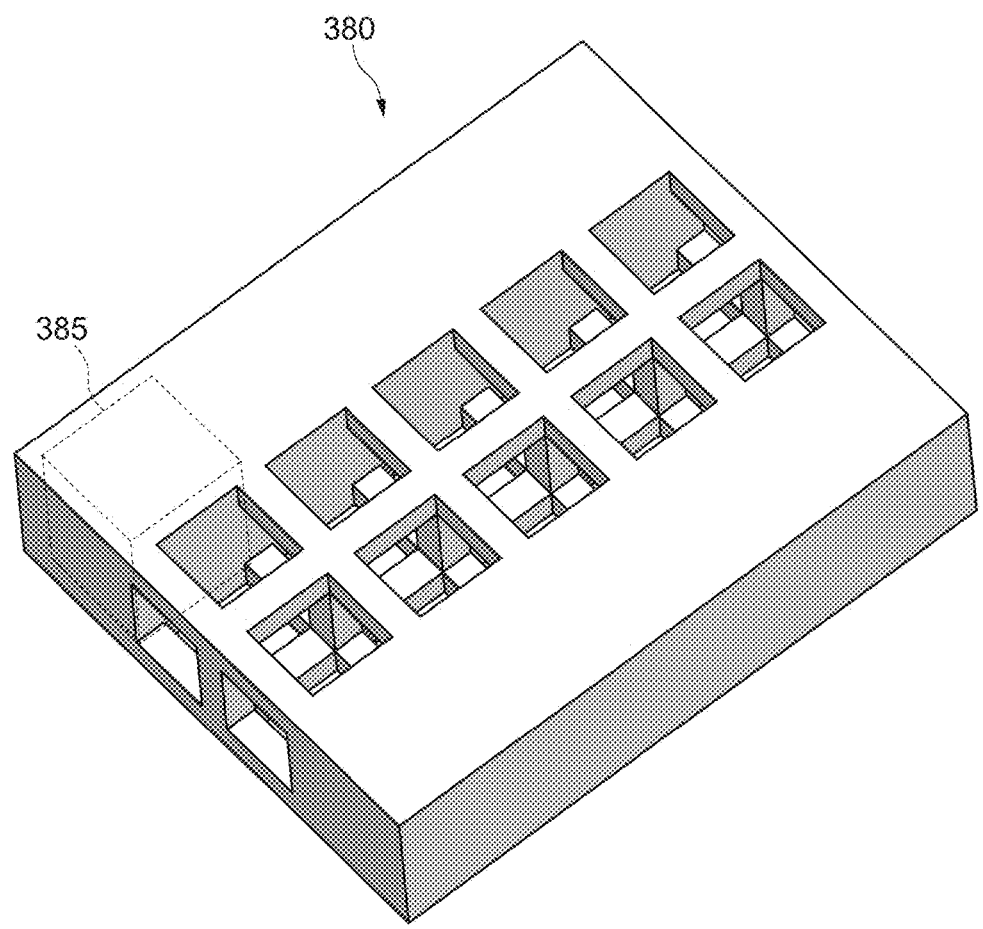
FIG. 16 is a perspective view showing a main portion of a structure formed by combining a closed cell as a unit cell including no opening and an open cell (semi-closed cell)

FIG. 16 is a perspective view showing a main portion of a structure 380 formed by combining unit cells 385 as closed cells and open cells (semi-closed cells). In such a structure 380, a coating material is formed on both the open cells and the semi-closed cells but is not formed on a surface forming the voids inside the closed cells.

In the structure 380, the open cells (or semi-closed cells) have a function to support the closed cells. By providing the voids that are blocked from the outside inside the closed cells, the structure 380 can be used as a structure that requires high heat resistance, for example.

It is of course possible to form a structure by combining all of the open cells, semi-closed cells, and the closed cells described above.

[Production Method for Structure]

The structures shown in FIGS. 1 to 16 can be formed by a system of a modeling apparatus, for example.

The modeling apparatus irradiates energy beams to a selected area based on 3D design data of a target structure out of the entire area of a supplied material and partially cures the supplied material. As a result, a structure having an arbitrary shape can be formed.

The energy beams are typically light, particularly ultraviolet rays. In this case, a UV-curable resin is used as the material. The energy beams are not limited to ultraviolet rays and may be infrared rays, visible light, electron beams, ultrasonic waves, or the like. Infrared rays, ultrasonic waves, and the like only need to be used when forming an object with a relatively-low modeling accuracy. For the light irradiation, a laser irradiation is typically used.

By using a modeling apparatus (structure forming apparatus) that uses a 1D regulation system, however, a highly-accurate structure can be formed at a practical speed and cost. The structure forming apparatus using the 1D regulation system is disclosed in, for example, Japanese Patent Application Laid-open No. 2011-98484. Alternatively, an apparatus described below may be used.

(Structure Forming Apparatus)

Hereinafter, the structure forming apparatus will be described. The structure forming apparatus basically uses a principle of a modeling apparatus. A structure formed by the structure forming apparatus is used not only as a model by also as an actual product.

(Structure of Structure Forming Apparatus)

Figure 17:
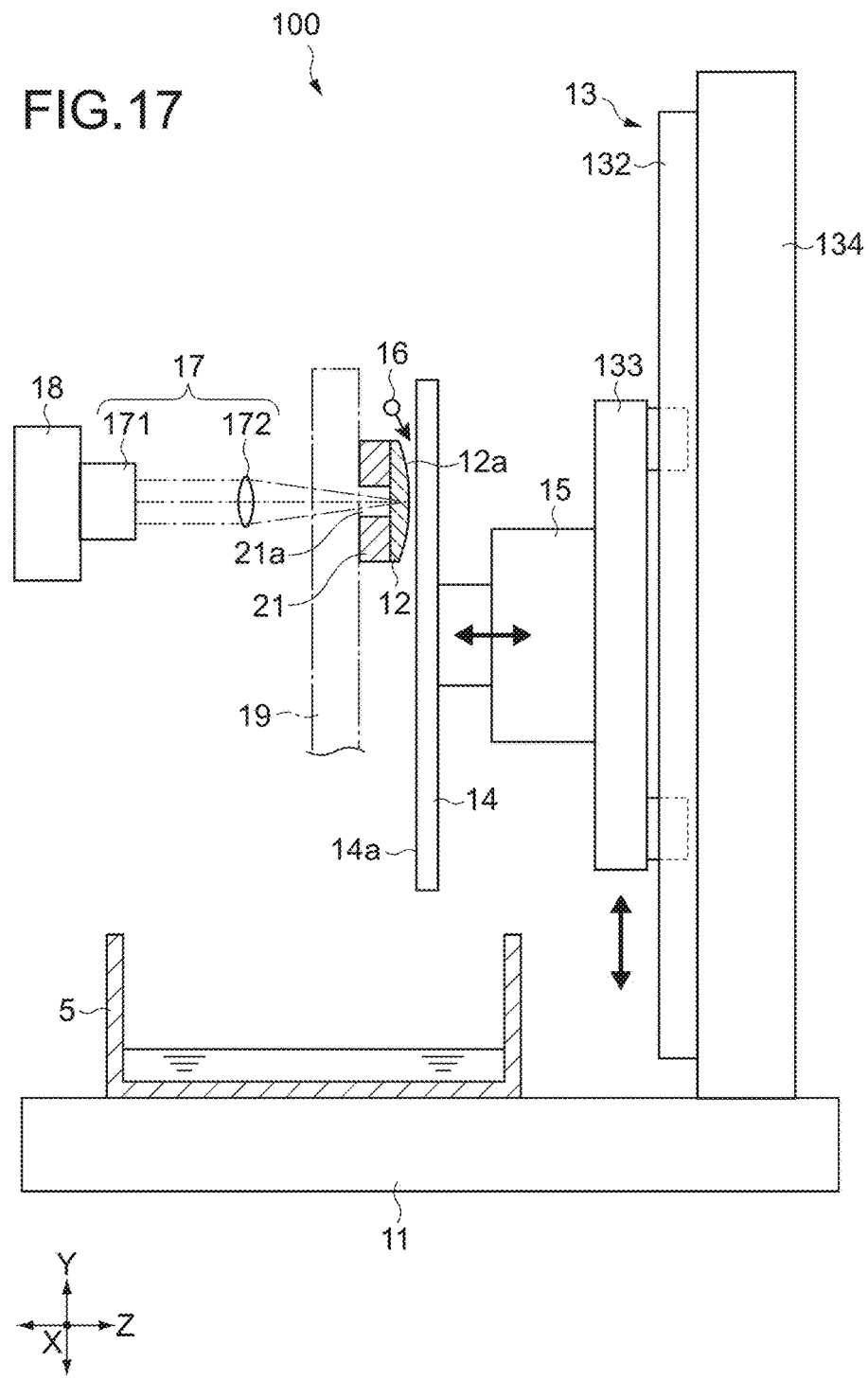
FIG. 17 is a side view of a structure forming apparatus according to an embodiment of the present disclosure.
Figure 18:
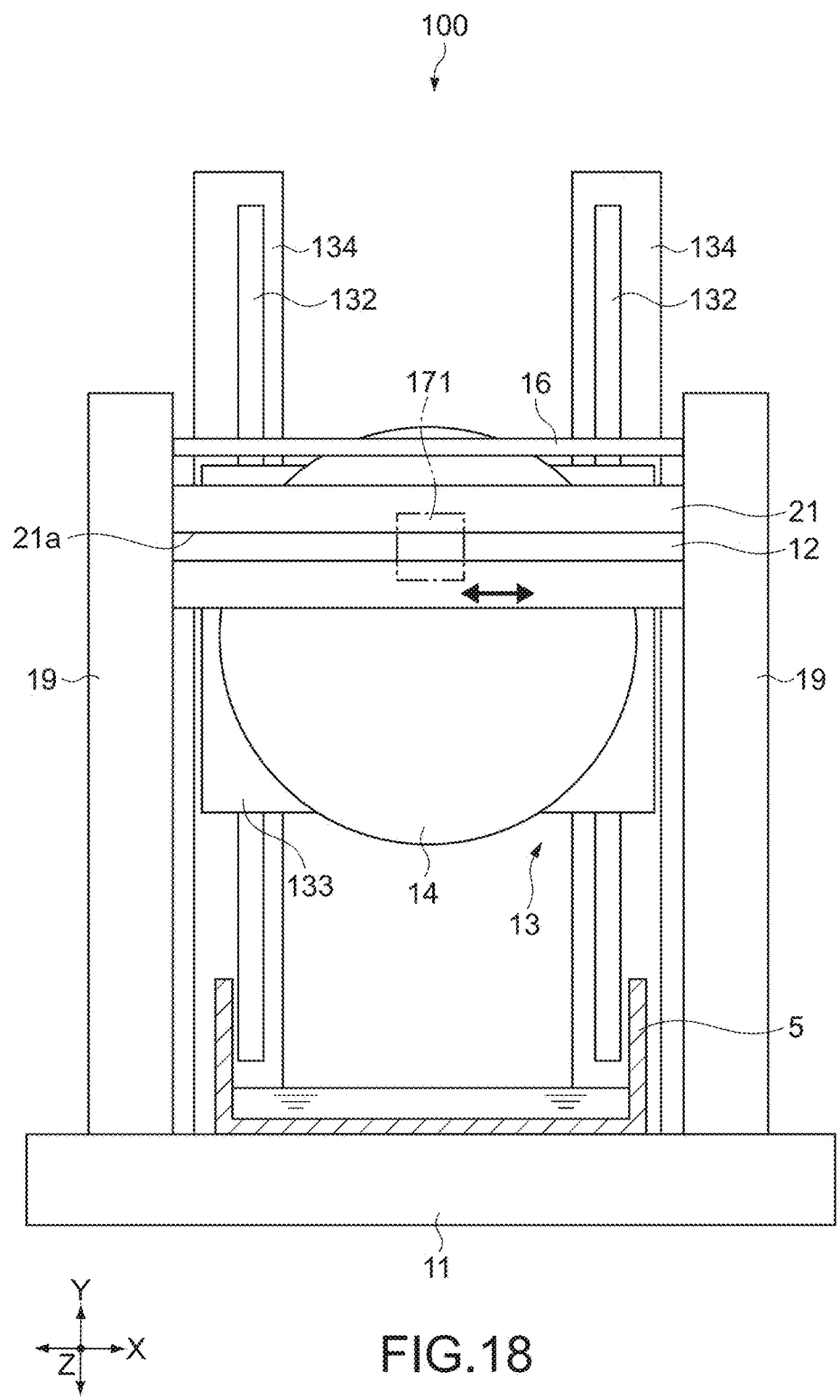
FIG. 18 is a side view of the structure forming apparatus in a Z-axis direction.
Figure 19:
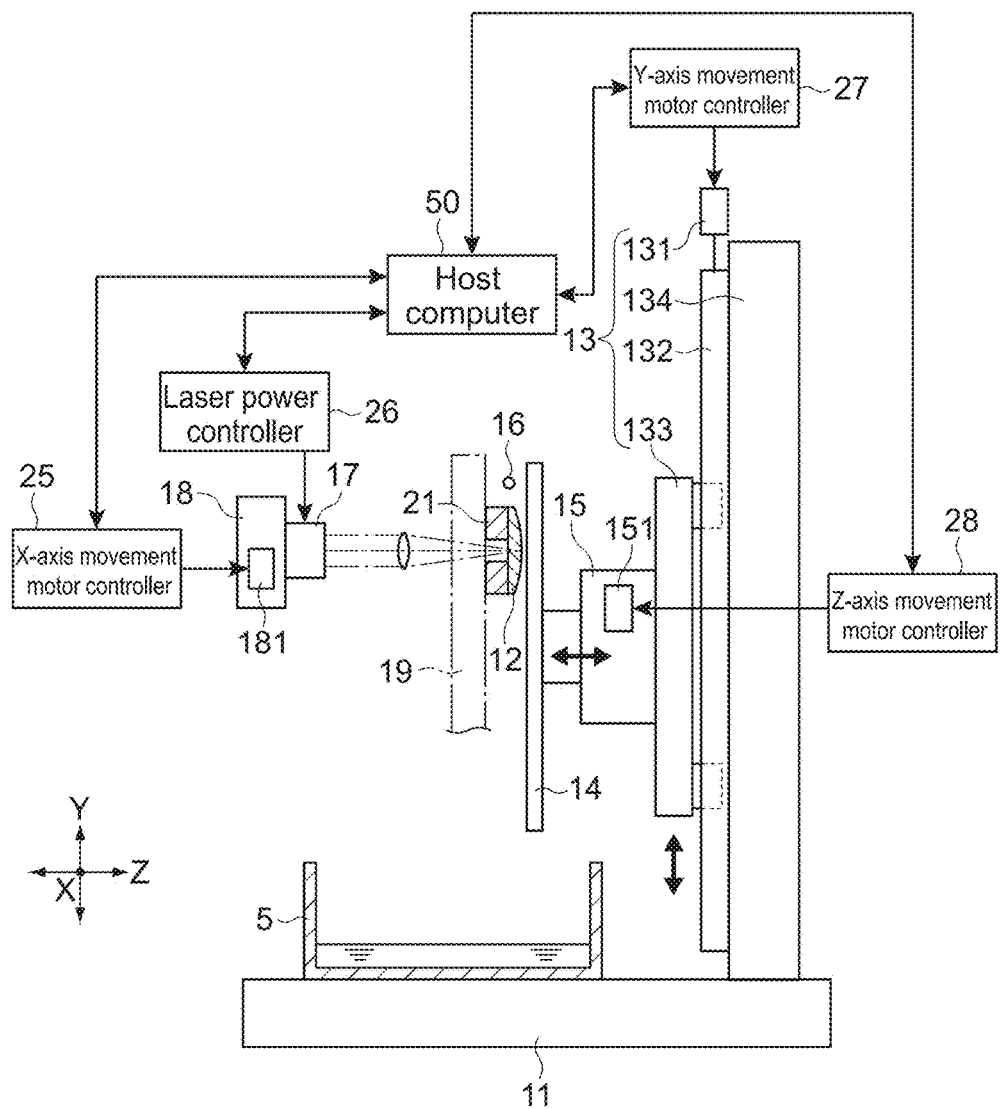
FIG. 19 is a schematic side view of the structure forming apparatus and a block diagram showing a structure of a control system.

FIG. 17 is a side view of a structure forming apparatus 100 according to an embodiment of the present disclosure. FIG. 18 is a side view of the structure forming apparatus in the Z-axis direction. FIG. 19 is a schematic side view of the structure forming apparatus and a block diagram showing a structure of a control system. In the figures, the X, Y, and Z axes are 3 orthogonal axes.

The structure forming apparatus 100 includes a base 11, a Y-axis movement mechanism 13 vertically erected on the base 11, a Z-axis movement mechanism 15 connected to the Y-axis movement mechanism 13, and a stage 14 connected to the Z-axis movement mechanism 15. The structure forming apparatus 100 also includes an irradiation unit 17 that irradiates, as energy beams, laser light such as ultraviolet rays toward the stage 14. The structure forming apparatus 100 also includes a regulation body 12 opposing the stage 14 and a supplying nozzle 16 that supplies a material such as a light-curable resin that is cured by laser light between the stage 14 and the regulation body 12.

The Y-axis movement mechanism 13 includes a Y-axis movement motor 131 (see FIG. 19), supporting columns 134 erected on the base 11, guide rails 132 provided on the supporting columns 134 in the Y-axis direction (second direction), and a movement base 133 that is connected to the guide rails 132 and is movable along the guide rails 132 by the Y-axis movement motor 131.

The Z-axis movement mechanism 15 includes a Z-axis movement motor 151 (see FIG. 19) and is capable of moving the stage 14 in the Z-axis direction. The stage 14 is, for example, circular as shown in FIG. 18, but may take a square shape or other shapes instead. The stage 14 is movable in the Y- and Z-axis directions by the Y-axis movement mechanism 13 and the Z-axis movement mechanism 15. By the Z-axis movement mechanism 15, a distance between a surface 14a of the stage 14 and an area of the regulation body 12 closest to the stage 14 out of a surface 12a thereof (linear area A1 to be described later) is controlled. The Y-axis movement mechanism 13 and the Z-axis movement mechanism 15 function as a movement mechanism.

Figure 20:
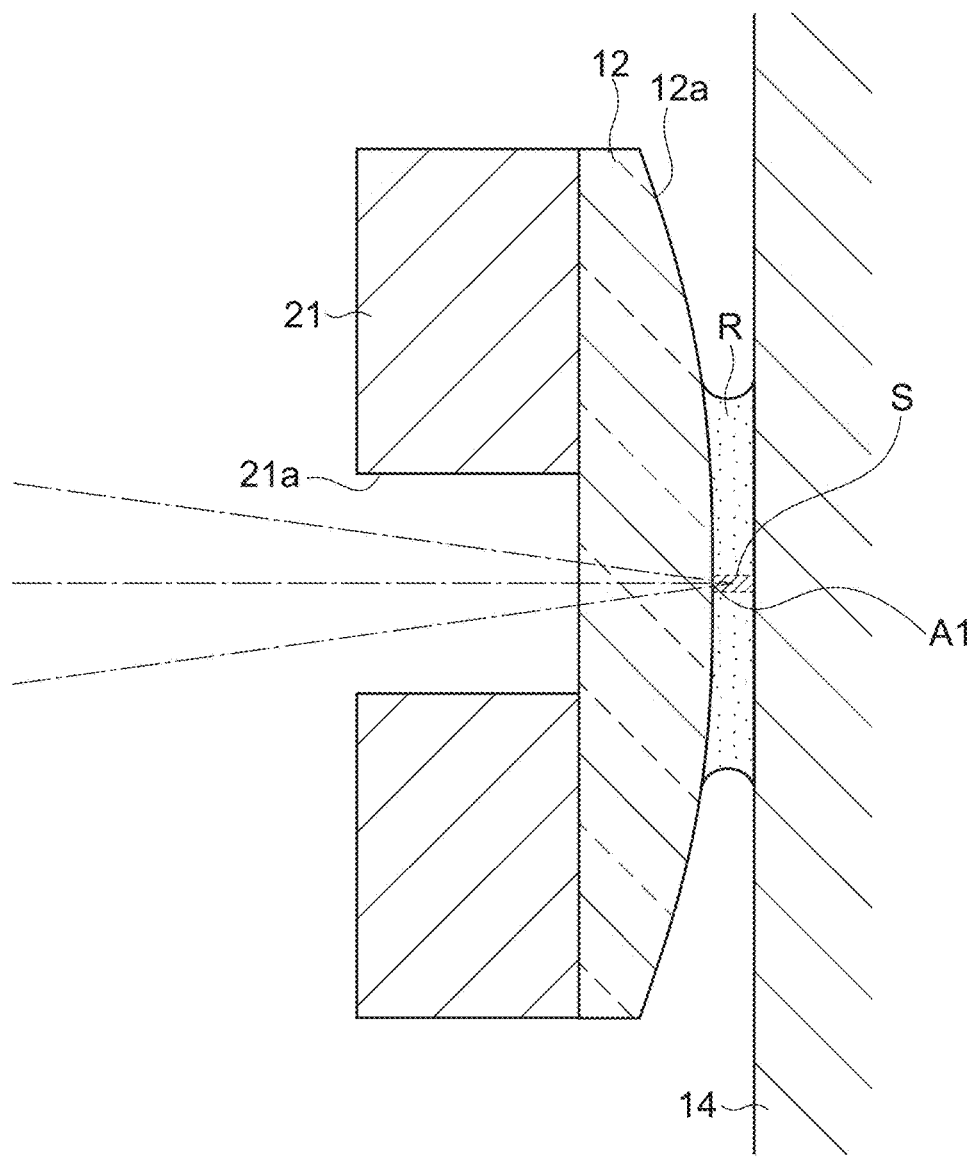
FIG. 20 is an enlarged diagram of a regulation body.

The regulation body 12 regulates a thickness of the material supplied from the supplying nozzle 16 to the surface 14a of the stage 14 in the Z-axis direction. FIG. 20 is an enlarged diagram of the regulation body 12. The regulation body 12 has a shape of a partial cylinder (cylindrical lens shape). In other words, the surface 12a of the regulation body 12 opposing the stage 14 is a curved surface that is formed as a cylindrical surface.

As shown in FIG. 18, the regulation body 12 is elongated in one direction (X-axis direction). The regulation body 12 is attached to supporting columns 19 by an attachment 21. In the attachment 21, a slit 21a is formed in the X-axis direction (first direction), and laser light from the irradiation unit 17 enters the regulation body 12 via the slit 21a.

The regulation body 12 is formed of glass, an acrylic material, or other transparent materials. The regulation body 12 may be formed of any material as long as it causes energy beams to transmit therethrough at a predetermined transmittance. A hydrophobic material (e.g., fluorine) that increases a contact angle of the material may be applied onto the surface 12a of the regulation body 12.

As shown in FIG. 20, the stage 14 can be set such that a slit area S is formed between the stage 14 and the surface 12a of the regulation body 12 by the Z-axis movement mechanism 15. The slit area S is formed by the surface 14a of the stage 14 opposing the linear area A1 formed in the X-axis direction, that is a portion closest to the stage 14 out of the surface 12a of the regulation body 12. The linear area A1 is a part of the surface 12a of the regulation body 12.

A width of the linear area A1 in the Y-axis direction is 0.1 to 1 mm. Moreover, a spot diameter of laser light irradiated from the irradiation unit 17 to be described later is 1 to 100 μm. However, the width of the linear area A1 and the spot diameter can be changed as appropriate based on the size of the regulation body 12, the size of the object (structure), a modeling accuracy, and the like and may also take values outside the ranges above.

The supplying nozzle 16 is elongated in the X-axis direction. The supplying nozzle 16 is provided above the regulation body 12 and attached to the supporting columns 19 by a member (not shown) via a supporting member, for example. As the supplying nozzle 16, a type of nozzle that includes a plurality of holes (not shown) from which a light-curable resin R (see FIG. 20) is discharged in the longitudinal direction is used. Alternatively, a slit-coat-type nozzle that includes a slit in the longitudinal direction may be used as the supplying nozzle 16.

It should be noted that a pump, a pipe, an open/close valve, and the like (not shown) for introducing the light-curable resin R into the supplying nozzle 16 are connected to the supplying nozzle 16, for example.

As shown in FIG. 17, the irradiation unit 17 includes a laser light source 171 and an objective lens 172 that narrows a beam spot of the laser light emitted from the laser light source 171. The laser light source 171 and the objective lens 172 are integrally held by a holder (not shown). The objective lens 172 focuses the laser light onto the light-curable resin R in the slit area S or a peripheral area including the slit area S via the regulation body 12. In other words, the objective lens 172 is set at a position on an optical axis at which the focal point of the laser light coincides with the light-curable resin R in at least the slit area S.

When the laser light emitted from the irradiation unit 17 is ultraviolet rays, a UV-curable resin is used as the light-curable resin R.

Further, the movement mechanism includes an X-axis movement mechanism (scanning mechanism) 18 that integrally moves the irradiation unit 17 in the X-axis direction and on which an X-axis movement motor 181 (see FIG. 19) is mounted. By the X-axis movement mechanism 18, the irradiation unit 17 is capable of scanning the laser light emitted from the irradiation unit 17 in the X-axis direction.

It should be noted that a polygon scanner or a galvano scanner may be used as the X-axis movement mechanism 18.

The slit 21a of the attachment 21 is elongated in the X-axis direction. Therefore, the X-axis movement mechanism 18 can cause the laser light to enter the regulation body 12 via the slit 21a while the laser light is being scanned.

The Z-axis movement mechanism 15, the Y-axis movement mechanism 13, and the X-axis movement mechanism 18 can be realized by, for example, a ball screw driving mechanism, a rack-and-pinion driving mechanism, a belt driving mechanism, and the like.

A waste tank 5 is provided below the stage 14 on the base 11. The waste tank 5 accumulates an excess light-curable resin and the like that is discharged from the supplying nozzle 16 and runs down the stage 14.

It should be noted that although the supporting columns 134 and the supporting columns 19 are provided two each (see FIG. 18), they may be provided one each at substantially the center of the base 11 in the X-axis direction.

As shown in FIG. 19, the structure forming apparatus 100 includes a Z-axis movement motor controller 28 that controls a drive of the Z-axis movement motor 151, a Y-axis movement motor controller 27 that controls a drive of the Y-axis movement motor 131, and an X-axis movement motor controller 25 that controls a drive of the X-axis movement motor 181. The structure forming apparatus 100 also includes a laser power controller 26 that controls a power of the laser light emitted from the laser light source 171. Operations of the controllers 25 to 28 are collectively controlled by a host computer 50. Although not shown, the structure forming apparatus 100 also includes a controller for driving the pump and open/close valve connected to the supplying nozzle 16.

The host computer 50 includes a CPU (Central Processing Unit), a RAM (Random Access Memory), and a ROM (Read Only Memory). A PLD (Programmable Logic Device) such as an FPGA (Field Programmable Gate Array) and an ASIC (Application Specific Integrated Circuit) may be used in place of the CPU. The controllers 25 to 28 include such hardware or constituted of software.

Typically, the host computer 50 and the controllers 25 to 28 are connected by wires, but at least one of the controllers may be wirelessly connected to a control system inside the structure forming apparatus 100.

(Operation of Structure Forming Apparatus)

Figure 21C:
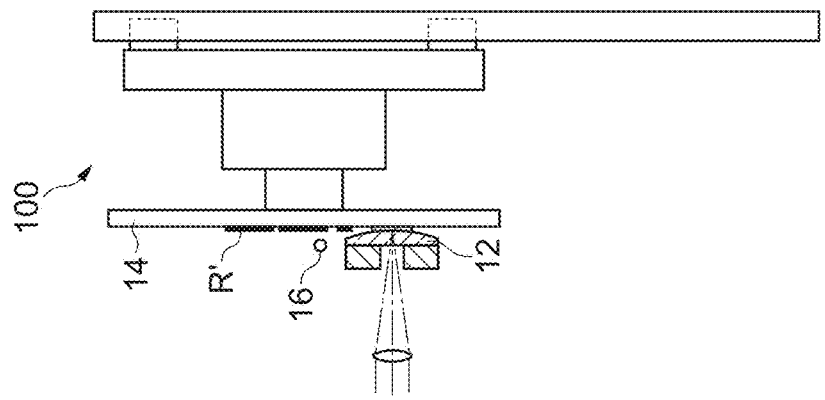
FIGS. 21A to 21C are diagrams sequentially showing an operation of the structure forming apparatus.
Figure 21B:
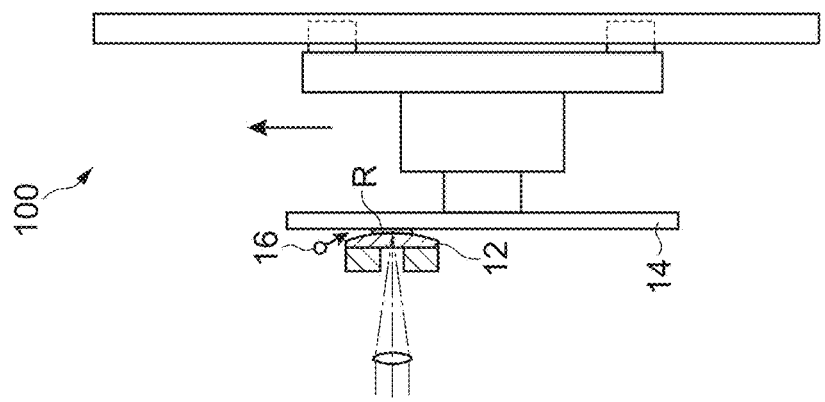
Figure 21A:
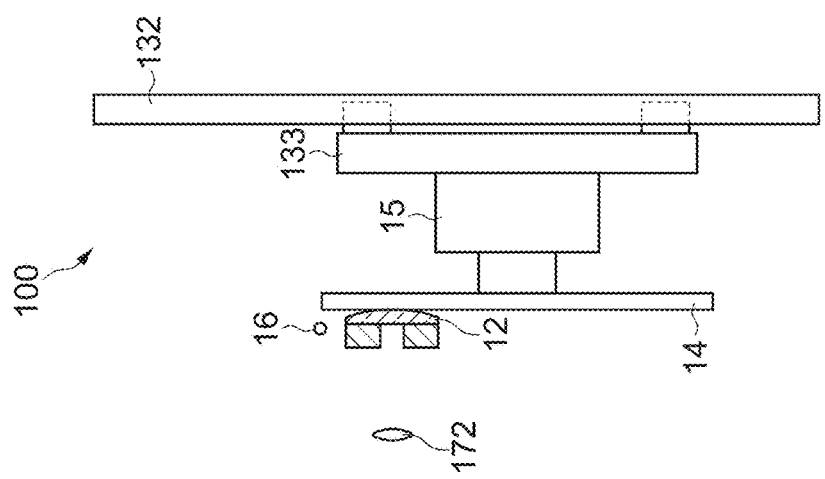

Next, an operation of the structure forming apparatus 100 structured as described above will be described. FIGS. 21A to 21C are diagrams sequentially showing the operation. FIGS. 22A to 22D are enlarged diagrams of the area between the regulation body 12 and the stage 14 during the operation.

FIG. 21A shows a static state of the structure forming apparatus 100 where the movement base 133 is at an initial position. Before actually executing modeling, a thickness corresponding to one layer of a hardening layer as the light-curable resin R is set via the host computer 50. Further, for example, a height position of the stage 14 at a time the stage 14 comes into contact with the linear area A1 as a portion closest to the stage 14 out of the regulation body 12 by the drive of the Z-axis movement mechanism 15 under control of the Z-axis movement motor controller 28 (see FIG. 21A) is set as a origin in the Z-axis direction.

It should be noted that the position of the stage 14 in the Y-axis direction when setting the origin can be set as appropriate.

Upon setting the origin, the stage 14 is moved away from the regulation body 12 by a preset amount corresponding to one layer of the light-curable resin R.

After the stage 14 is moved away from the regulation body 12, the stage 14 is moved to a modeling start position that is a predetermined position as shown in FIG. 21B by the Y-axis movement mechanism 13. The modeling start position is a position of the stage 14 in the Y-axis direction at which the slit area S between the stage 14 and the linear area A1 of the regulation body 12 can be formed. The modeling start position can be changed as appropriate based on the size of the structure to be formed in the Y-axis direction as long as it is a position on the stage 14 at which the slit area S can be formed.

After the stage 14 is positioned at the modeling start position, the light-curable resin R is discharged from the supplying nozzle 16 and dropped between the regulation body 12 and the stage 14 by its own weight. As a result, at least the slit area S is filled with the light-curable resin R. The light-curable resin R is held between the regulation body 12 and the stage 14 by a surface tension. In other words, by the linear area A1, the regulation body 12 regulates a fluid level of the light-curable resin R in a 1-dimensional area along the X-axis direction. FIG. 20 shows the enlarged diagram of the slit area S and the peripheral area at this time. From such a state, the irradiation of laser light onto the light-curable resin R, that is, an exposure is started.

The irradiation unit 17 irradiates laser light. The laser light emitted from the laser light source 171 passes through the objective lens 172 and the regulation body 12 and enters the light-curable resin R in the slit area S. While moving in the X-axis direction under control of the X-axis movement motor controller 25, the irradiation unit 17 selectively exposes the light-curable resin R under control of the laser power controller 26 based on data for a single line in the X-axis direction within data for a single layer of a modeling target (see FIG. 22A).

Specifically, the laser power controller 26 generates a modulation signal of a laser power based on the data for a single line of the structure and transmits the signal to the laser light source 171. As a result, the light-curable resin R for a single line in the X-axis direction in a single layer is selectively exposed and cured. At least the light-curable resin R in the slit area S is exposed. The stage 14 does not move during the exposure by the irradiation of laser light.

A thickness of a single layer of the structure is 1 to 100 μm, but the thickness is not limited to this range and can be set as appropriate.

A hardening layer R0 corresponding to a single line is formed as described above as shown in FIG. 22A.

After the exposure of the light-curable resin R for a single line in the X-axis direction is ended, the laser light irradiation operation stops, and the stage 14 moves in a back direction along the Y axis (upper side in FIG. 21B) at a predetermined pitch by a movement of the movement base 133 by the Y-axis movement mechanism 13. At this time, as shown in FIGS. 22B and 22C, by the hardening layer R0 moving with the stage 14, a shearing force is generated between the regulation body 12 and the hardening layer R0 to thus peel off the hardening layer R0 from the regulation body 12. Since the hydrophobic film is formed on the surface of the regulation body 12 as described above, the peeling can be performed with ease.

Figure 22D:
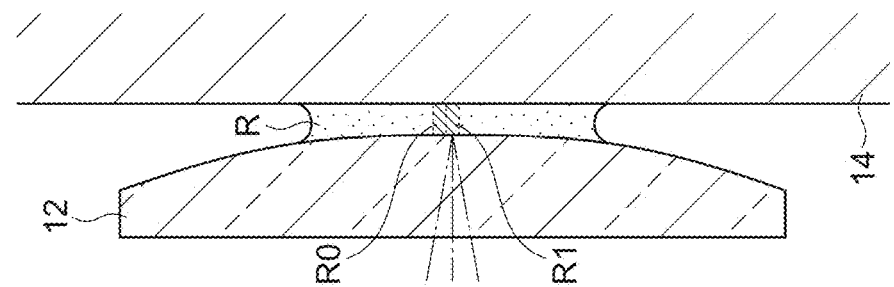
FIGS. 22A to 22D are enlarged diagrams of an area between the regulation body and a stage during the operation.
Figure 22C:
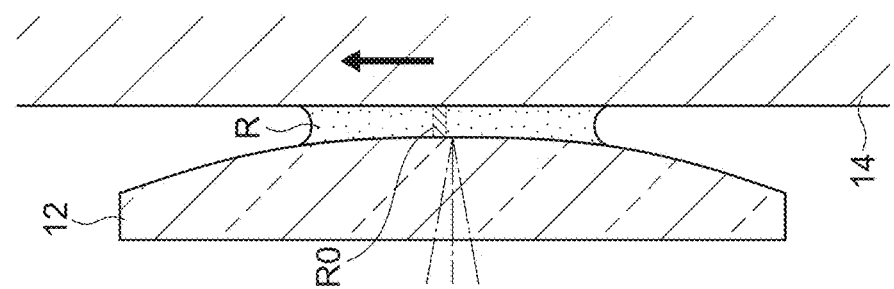
Figure 22B:
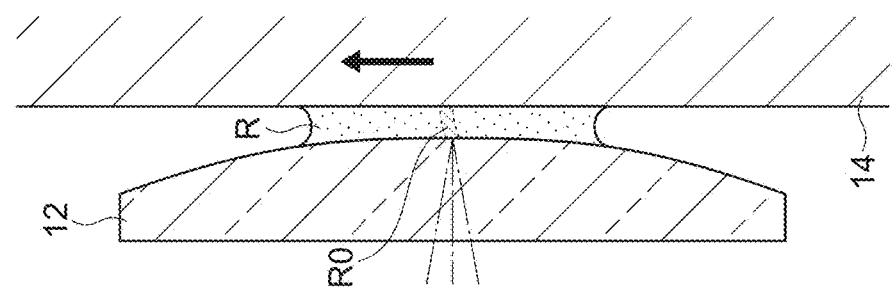
Figure 22A:
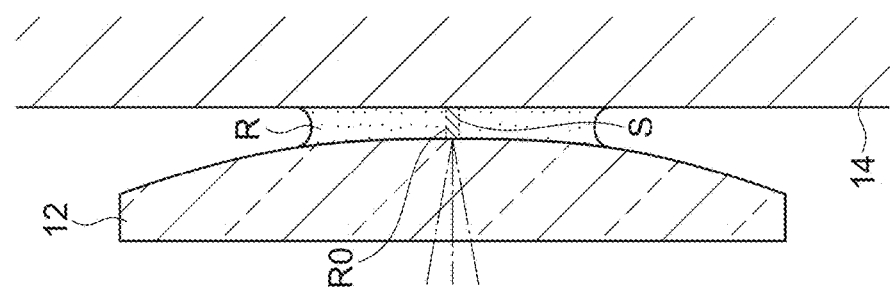

Then, a selective expose for the next one line (line adjacent to first line) in the first layer is carried out in the same manner (see FIG. 22D). As a result, a hardened material R1 of that line is formed.

By repeating the scanning irradiation of the laser light in the X-axis direction as described above and the step feed of the stage 14 in the Y-axis direction, the structure forming apparatus 100 forms a selective hardening layer of the light-curable resin R for one layer, that is, a hardening layer R' for one layer as shown in FIG. 21C. As described above, exposure processing for one layer is carried out by so-called raster scanning.

Such an intermittent movement pitch of the stage 14 in the Y-axis direction can be set as appropriate although it depends on the spot diameter of laser beams, that is, a resolution in forming the structure.

After the exposure of the light-curable resin R for one layer is ended, the stage 14 moves farther away from the regulation body 12 in the Z-axis direction. Then, by repeating the operation described heretofore, hardening layers R' are laminated so as to form a structure having an arbitrary shape.

As described above, since the surface 12a of the regulation body 12 is formed as a cylindrical surface so that the linear area A1 of the regulation body 12 comes closest to the stage 14, by moving the stage 14 in the Y-axis direction, the linear area A1 of the regulation body 12 moves so as to relatively move away from the stage 14 in the Z-axis direction. As a result, a shearing force is generated as described above, and the hardened material (R0 and R1 shown in FIGS. 22B and 22D) can be neatly peeled off from the regulation body 12.

The regulation level method of the related art has had a problem that a flatness of a structure is lowered due to a distortion in a film or glass surface. In contrast, in this embodiment, since the surface of the regulation body 12 is formed as a cylindrical surface, the fluid level of the light-curable material is regulated in the linear area A1. Therefore, even when a contraction force that is generated when curing the light-curable resin R is applied to the regulation body 12, the regulation body 12 is hardly deformed or distorted, and a deformation of the regulation body 12 due to a viscosity of the light-curable resin R before the exposure can also be prevented. Accordingly, it becomes possible to enhance the flatness of the hardened layer and control the thickness thereof with high accuracy. As a result, the structures shown in FIGS. 1 to 16 can be formed in a small size.

In the regulation level method of the related art, the process of peeling the structure from the film or glass surface has required time. In this embodiment, however, the structure is peeled off from the regulation body 12 every time the step feed of the stage 14 is performed in the Y-axis direction in the exposure processing. In other words, since time slots of the exposure processing and peel-off processing for one layer overlap, the time required for forming the structure can be shortened.

Since the fluid level of the light-curable material in the linear area A1 is regulated in this embodiment, the structure can be formed with an accurate layer thickness even when a highly-viscous material is used, thus widening a selection range of the material to be used.

In this embodiment, the peeling of the regulation body 12 from the stage 14 side occurs intermittently (every time step feed is performed in Y-axis direction) by minute amounts in the linear area A1 of the regulation body 12. Therefore, the peeling force is weak, and the hardened material can be prevented from being damaged. In other words, the hardened material can be peeled off from the regulation body 12 with ease. Moreover, since the peeling force is weak as described above, the hardened material is not peeled off from the stage 14.

As described above, according to the structure forming apparatus 100 of this embodiment, the structures shown in FIGS. 1 to 16 can be formed highly accurately at a practical speed and cost. In particular, the structure forming apparatus 100 can form a structure highly accurately at a practical speed even when the structure has a minute complex shape.

[Formation of Structure by Attaching Plurality of Substrate Parts]

FIG. 23 are diagrams for explaining a method of producing a substrate by attaching a plurality of substrate parts.

Figure 23A:
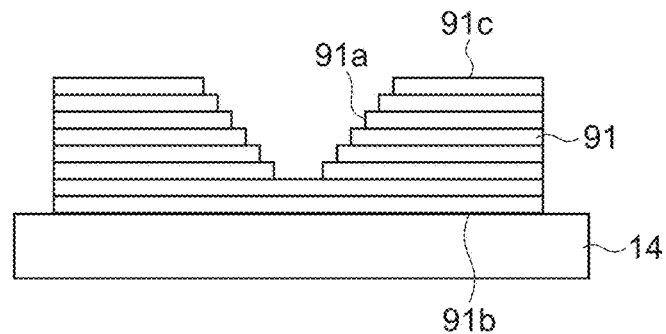
FIG. 23 are diagrams for explaining a method of producing a substrate by attaching a plurality of substrate parts.

As shown in FIG. 23A, a substrate part 91 including a concave portion 91a, for example, is formed by the structure forming apparatus 100. The substrate part 91 is formed such that a void ratio increases from a first side 91b as a side closer to the stage 14 toward a second side 91c as a side farther from the stage 14.

Figure 23B:
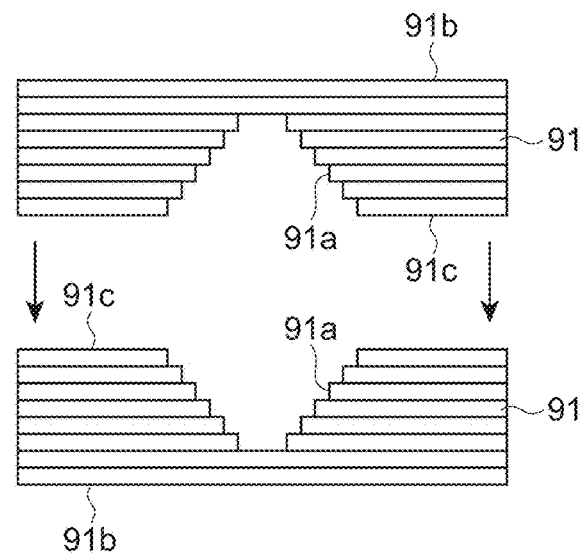

Such a substrate part 91 is formed plurally, two in this embodiment. As shown in FIG. 23B, the substrate parts 91 are attached such that the second sides 91c thereof are connected.

Figure 23C:
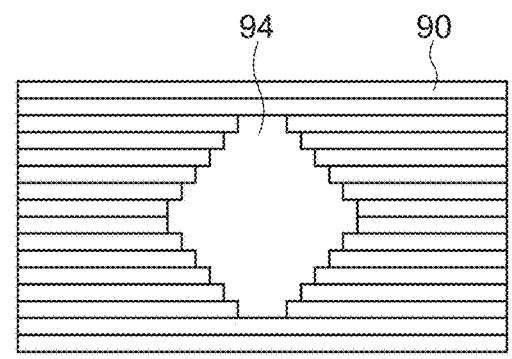

As a result, a substrate 90 having a void 94 as shown in FIG. 23C is formed. The substrate 90 is formed such that the void ratio of the void 94 decreases 2- or 3-dimensionally from an inner side of the substrate toward an outer side thereof.

By producing the substrate in parts as described above, there are the following merits. It is assumed that the substrate part 91 is formed from the second side 91c as a side closer to the stage 14. In this case, when a volume on the second side 91c is extremely small and that on the first side 91b is large, a stability of the substrate part 91 on the stage 14 is lowered. Therefore, by setting the material having a larger volume at a position closer to the stage as shown in FIG. 23A, such a problem on the stability can be eliminated.

It should be noted that to held understand the description, the substrate 90 of this embodiment has taken a simple shape. However, according to a well-known modeling apparatus or the structure forming apparatus 100, a substrate having a complex shape can of course be formed.

[Formation of Structure by Attaching Plurality of Sheet-like Substrates]

Figure 24:
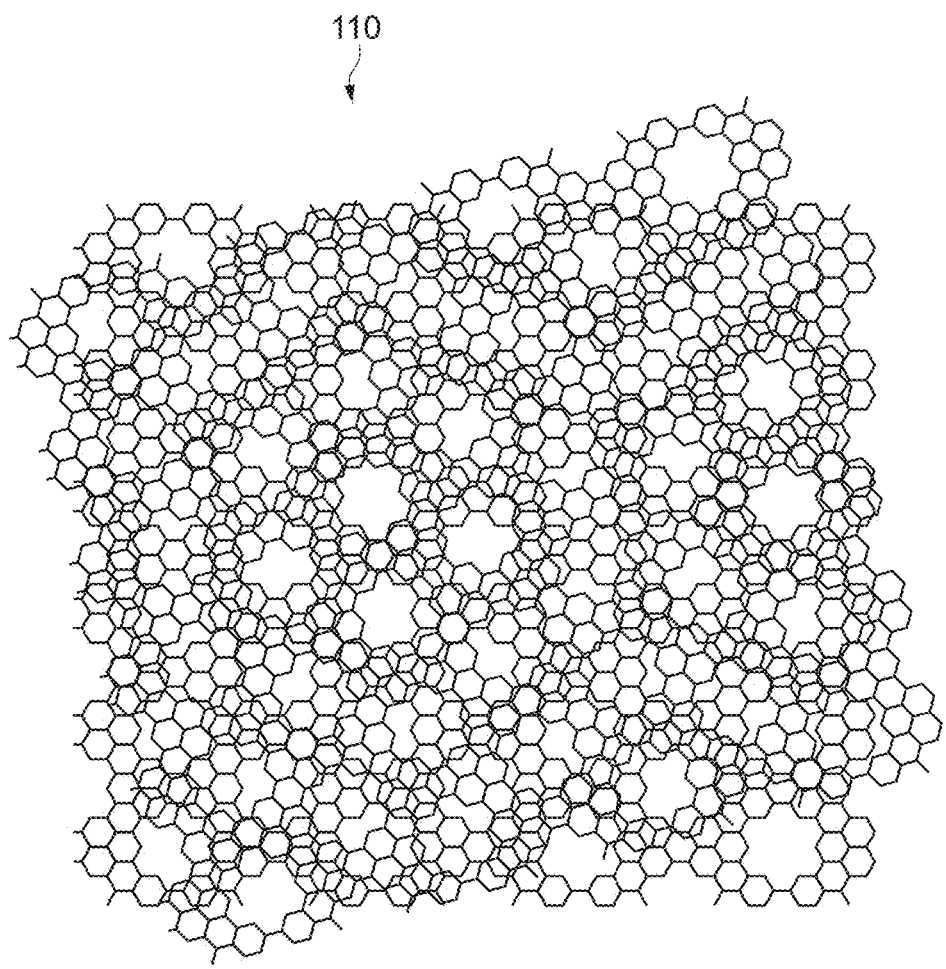
FIG. 24 is a plan view showing a substrate (structure) formed by attaching the plurality of sheet-like substrates shown in FIG. 12 while deviating the sheets in a rotational direction.

FIG. 24 is a plan view showing a substrate formed by attaching a plurality of sheet-like substrates shown in FIG. 12, for example. In this example, two sheet-like substrates are attached. Specifically, the sheet-like substrates are attached while being deviated in a rotational direction about an axis vertical to an attachment surface of the sheet-like substrates.

Figure 25:
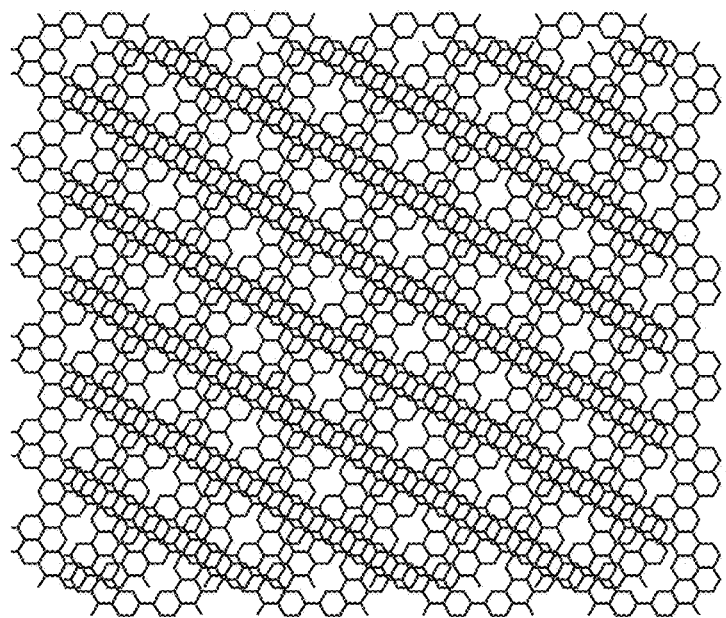
FIG. 25 shows a structure formed by attaching the sheet-like substrates shown in FIG. 12 while linearly deviating the sheets.
Figure 26:
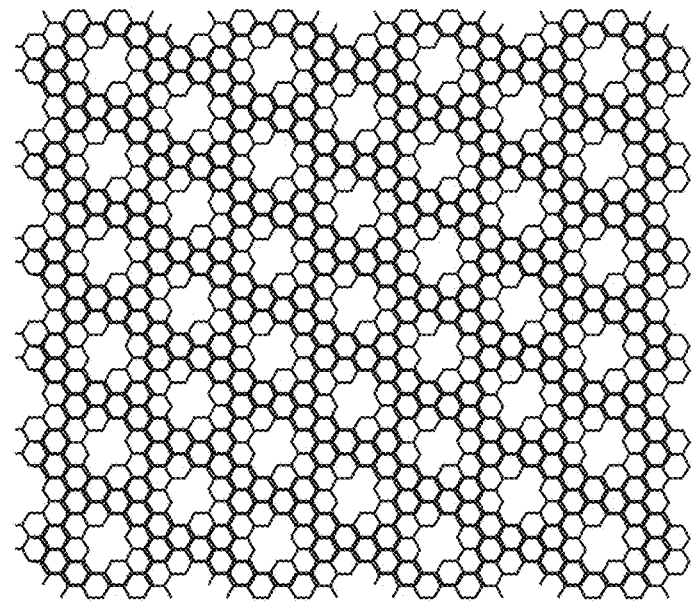
FIG. 26 shows a structure formed by attaching the sheet-like substrates shown in FIG. 12 while linearly deviating the sheets.
Figure 27:
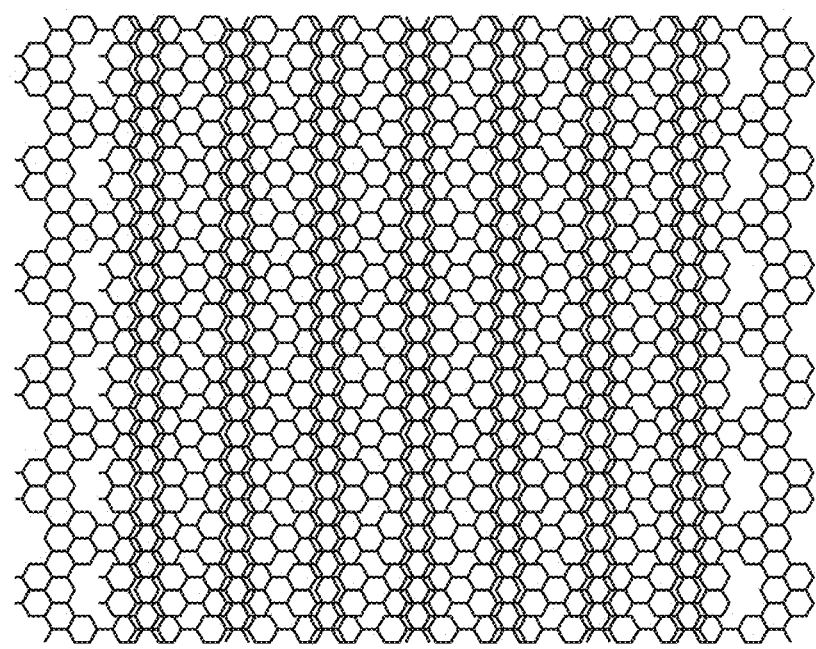
FIG. 27 shows a structure formed by attaching the sheet-like substrates shown in FIG. 12 while linearly deviating the sheets.

FIGS. 25 to 27 exemplify substrates formed by attaching the sheet-like substrates not in the rotational direction as shown in FIG. 24 but linearly. In the examples shown in FIGS. 25 to 27, overlapping portions of the sheet-like substrates change cyclically with a directionality. Such a structure may be unfavorable in terms of the intensity, for example. Moreover, in the case of a large substrate, it is difficult to attach all the sheet-like substrates with the same positional relationship due to a local expansion and contraction.

By the production method for the substrate 110 shown in FIG. 24, attachment position accuracy of the two sheet-like substrates does not need to be high, and a structure having an enough intensity to endure a stress from any direction at any position can be realized.

Looking at the substrate 110 from a distance, large hexagonal portions can be confirmed. In other words, the structure 110 maintains a self-similar periodic structure even when the two sheet-like substrates are attached. The periodic structure depends on a rotational angle for attaching the two sheet-like substrates.

The technique for the structure formed by attaching the sheet-like substrates as described above is not limited to the case of the sheet-like substrate having a honeycomb structure. Any sheet-like substrate and structure may be used as long as the void ratio of the sheet-like substrate or a structure constituted of the sheet-like substrates decreases from an inner side of the sheet-like substrate toward an outer side thereof.

[Other Embodiments]

The present disclosure is not limited to the embodiment described above, and various other embodiments may also be realized.

Although the regulation body of the structure forming apparatus according to the embodiments above takes a partial cylinder shape, it may take a full cylinder shape instead. In this case, the regulation body may be of a solid type formed of a material transparent with respect to energy beams or a hollow type.

The surface shape of the regulation body may be a curved surface such as an elliptical surface and a hyperboloid surface. Alternatively, the surface may be a plane having a narrow width in the Y-axis direction (about 2 to 5 times the laser spot diameter) instead of the curved surface.

In the embodiments above, the regulation body 12 is static and the stage 14 moves in the Z-axis direction during modeling. However, the system is not limited to such a system, and the stage 14 may be static while the regulation body moves in the Z-axis direction, or both of them may move.

In the embodiments above, the stage 14 moves vertically for forming one layer of a hardened layer of a structure. However, the regulation body and stage may relatively move in the horizontal direction for forming one layer of a hardened layer of a structure or relatively move in a direction that includes a component in the vertical direction and is different from the vertical direction, that is, an oblique direction.

In the embodiments above, the direction in which the regulation body 12 and the stage 14 move relatively for forming one layer of a hardened layer of a structure is a direction orthogonal to a direction in which the linear area A1 of the regulation body 12 extends (first direction). However, the second direction only needs to be different from the first direction and may be a direction oblique to the first direction. Alternatively, the longitudinal direction of the regulation body 12 may be set to tilt in the oblique direction in advance when seen as a plane (in Z-axis direction).

In the embodiments above, the regulation body 12 and the stage 14 are static in the X-axis direction while the irradiation unit 17 moves in the X-axis direction. However, the irradiation unit 17 may be static, and the regulation body 12 and the stage 14 may integrally move in the X-axis direction.

All the structures described above other than the structures shown in FIGS. 22 and 23 may be formed by injection molding or other methods instead of being formed by the modeling apparatus (structure forming apparatus) as described above.

At least two of the feature portions of the structures described above may be combined.

The present disclosure may also take the following structures.

(1) A structure, including:
a substrate that includes a plurality of voids and a surface on which at least the plurality of voids are formed, and is formed such that a void ratio of the plurality of voids decreases one of 2-dimensionally and 3-dimensionally from an inner side of the substrate toward an outer side thereof; and
a coating material formed on the surface of the substrate.

(2) The structure according to (1),
in which the substrate further includes a communication hole that makes the plurality of voids communicate.

(3) The structure according to (2),
in which the substrate includes a plurality of communication holes, and in which a shortest distance encompassing the surface of the substrate via the plurality of voids and the plurality of communication holes is 100 to 10000 times the coating material in a thickness direction.

(4) The structure according to any one of (1) to (3),
in which the coating material includes a metal layer.

(5) The structure according to (4),
in which the coating material further includes a resin layer formed on the metal layer.

(6) The structure according to any one of (1) to (5),
in which the plurality of voids are aligned regularly on the substrate.

(7) The structure according to (6),
in which an alignment of opening surfaces of the plurality of voids is a honeycomb structure.

(8) A production method for a structure, including:
supplying a material of a substrate that cures by an energy of an energy beam to a supply area;
forming, by irradiating the energy beam onto an area selected from an entire area of the material supplied to the supply area, the substrate that includes a plurality of voids and a surface on which at least the plurality of voids are formed and is formed such that a void ratio of the plurality of voids decreases one of 2-dimensionally and 3-dimensionally from an inner side of the substrate toward an outer side thereof; and
forming a coating material on the surface of the formed substrate.

(9) The production method for a structure according to (8),
in which the production method for a structure uses a structure forming apparatus including a stage and a regulation body, the regulation body including a surface having a linear area formed along a first direction and being provided opposed to the stage such that the linear area comes closest to the stage out of the surface,
in which the supplying of the material includes supplying the material to a slit area as an area between an area on a side on which the stage is arranged and the linear area, and
in which the forming of the substrate includes curing at least one layer of the material by relatively moving the regulation body and the stage along a second direction different from the first direction.

(10) The production method for a structure according to (9),
in which the forming of the substrate includes
forming a part of the substrate such that the void ratio of the part of the substrate increases from a first side closer to the stage toward a second side farther from the stage, forming a plurality of parts of the substrate, and
attaching the plurality of parts of the substrate such that the plurality of parts of the substrate are connected on the second sides thereof.

(11) The production method for a structure according to (8),
in which the forming of the substrate includes forming a sheet-like substrate such that the void ratio decreases 2-dimensionally from an inner side of the sheet-like substrate toward an outer side thereof and the plurality of voids are aligned regularly, and
in which the sheet-like substrate is prepared plurally,
the production method for a structure further including attaching the sheet-like substrates such that the sheet-like substrates are deviated in a rotational direction about an axis vertical to an attachment surface of the sheet-like substrates.

[Form Beyond Range of Present Disclosure]

Although beyond the range of the present disclosure, a structure formed by aggregating one type of unit cells 75 as shown in FIG. 8, for example, may be realized. In other words, sizes of the openings of the unit cells 75 may be set to be constant. Alternatively, by arranging the unit cells 75 at arbitrary positions, a freely-shaped structure can be formed, and a structure having different bending rigidities depending on the directions can be produced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A structure, comprising:
a substrate that includes a plurality of unit cells, wherein the plurality of unit cells further includes a plurality of voids, each void of the plurality of voids extending along a central longitudinal axis of a unit cell, the plurality of voids aligned regularly such that a void ratio of the plurality of voids in the substrate decreases one of 2-dimensionally or 3-dimensionally from an inner side of the substrate toward an outer side thereof,
wherein each unit cell of the plurality of unit cells has a hexagonal cross-section perpendicular to its central longitudinal axis and includes:
an upper wall, a middle wall, and a lower wall arranged parallel to each other;
a plurality of first communication holes opening on lateral side surfaces of the unit cell and positioned between the upper wall and the middle wall;
and a plurality of second communication holes opening on lateral side surfaces of the unit cell and positioned between the middle wall and the lower wall,
wherein each first communication hole of the plurality of first communication holes extends uninterruptedly from a respective first lateral side surface to a respective second lateral side surface of the unit cell, and wherein each second communication hole of the plurality of second communication holes extends uninterruptedly from the respective second lateral side surface to a respective third lateral side surface of the unit cell, wherein the third respective lateral side surface is adjacent to the second respective lateral side surface and the second respective lateral side surface is adjacent to the first respective lateral side surface of the unit cell;
and a coating material formed on a surface of the substrate.

2. The structure according to claim 1, wherein the plurality of first communication holes and the plurality of second communication holes cause the unit cell of the plurality of unit cells to communicate with an adjacent unit cell of the plurality of unit cells.

3. The structure according to claim 1, wherein a shortest distance across the surface of the substrate that is located between the plurality of voids and the plurality of the first communication holes or the plurality of second communication holes is 100 to 10000 times a thickness of the coating material.

4. The structure according to claim 1, wherein the coating material includes a metal layer.

5. The structure according to claim 4, wherein the coating material further includes a resin layer formed on the metal layer.

6. The structure according to claim 1, wherein the plurality of unit cells are aligned regularly on the substrate.

7. The structure according to claim 6, wherein an alignment of opening surfaces of the plurality of voids in the substrate is a honeycomb structure.

8. The structure according to claim 1, wherein a pitch of the plurality of voids changes at a predetermined rate from the inner side of the substrate to the outer side of the substrate.

* * * * *